: US 12,467,481 B2
(45) Date of Patent: Nov. 11, 2025

(54) HYDRAULIC VALVE ASSEMBLY

(71) Applicant: HAWE Hydraulik SE, Aschheim (DE)

(72) Inventors: Thomas Wechsel, Aschheim (DE);
Martin Heusser, Aschheim (DE);
Jean-Michel Sabatier, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 95 days.

(21) Appl. No.: 18/358,467

(22) Filed: Jul. 25, 2023

(65) Prior Publication Data

US 2024/0044344 A1 Feb. 8, 2024

(30) Foreign Application Priority Data

Jul. 28, 2022 (DE) .................... 10 2022 207 778.4
Jul. 28, 2022 (DE) .................... 10 2022 207 790.3
Jul. 28, 2022 (DE) .................... 10 2022 207 791.1

(51) Int. Cl.
*F15B 11/15* (2006.01)

(52) U.S. Cl.
CPC ..... *F15B 11/15* (2013.01); *F15B 2211/30515* (2013.01); *F15B 2211/30595* (2013.01); *F15B 2211/40507* (2013.01); *F15B 2211/50518* (2013.01); *F15B 2211/7142* (2013.01)

(58) Field of Classification Search
CPC ........... F15B 11/15; F15B 2211/30515; F15B 2211/30595; F15B 2211/40507; F15B 2211/50518; F15B 2211/7142
See application file for complete search history.

(56) References Cited

U.S. PATENT DOCUMENTS 4,078,681 A * 3/1978 Field, Jr. ................. F15B 11/17
91/509
4,129,987 A * 12/1978 Blume .................... F15B 11/15
60/484

(Continued)

FOREIGN PATENT DOCUMENTS

DE 3139635 A1 * 4/1983
DE 3430038 A1 * 2/1986

(Continued)

OTHER PUBLICATIONS

Examination Report for German Application No. 10 2022 207 778.4 dated Mar. 17, 2023, 10 pages.

(Continued)

*Primary Examiner* — Jessica Cahill
(74) *Attorney, Agent, or Firm* — Dinsmore & Shohl LLP

(57) ABSTRACT

A hydraulic valve assembly includes a connection section, a first valve section, at least one second valve section, and a hydraulic pilot control device with a pilot valve device. The first valve section has a first spool piston and a first spool diverter. The second valve section has a second spool piston and a second spool diverter. The first spool diverter and the second spool diverter are each switchable to at least a first spool diverter switching position and a second spool diverter switching position. Pilot pressure is applied in parallel to the first spool diverter and the second spool diverter via the hydraulic pilot control device in a first switching position of the pilot valve device for switching together into the first spool diverter switching position.

14 Claims, 9 Drawing Sheets

(56) References Cited

U.S. PATENT DOCUMENTS

| | | | | |
|---|---|---|---|---|
| 2001/0030085 A1* | 10/2001 | Nagata | ............... | B66F 9/22 |
| | | | | 187/222 |
| 2005/0229594 A1* | 10/2005 | Nanjo | ............... | F15B 11/17 |
| | | | | 60/484 |
| 2019/0249692 A1* | 8/2019 | Wechsel | ............... | F15B 20/00 |
| 2022/0128069 A1* | 4/2022 | Diebold | ............... | B66C 13/18 |

FOREIGN PATENT DOCUMENTS

| | | | |
|---|---|---|---|
| DE | 4324177 A1 * | 2/1994 | ............ F15B 11/165 |
| DE | 10 2016 205 582 A1 | 10/2017 | |
| DE | 10 2016 123 503 A1 | 6/2018 | |
| DE | 10 2018 202 148 B3 | 3/2019 | |
| DE | 10 2019 201 182 A1 | 7/2020 | |
| JP | 05133323 A2 | 5/1993 | |
| JP | 06336975 A2 | 12/1994 | |

OTHER PUBLICATIONS

Examination Report for German Application No. 10 2022 207 790.3 dated Mar. 17, 2023, 11 pages.
Examination Report for German Application No. 10 2022 207 791.1, dated Mar. 17, 2023, 11 pages.

* cited by examiner

HYDRAULIC VALVE ASSEMBLY

CROSS REFERENCE TO RELATED APPLICATION

This application claims priority to German Application 10 2022 207 790.3, filed Jul. 28, 2022, German Application 10 2022 207 791.1, filed Jul. 28, 2022 and German Application 10 2022 207 778.4 filed Jul. 28, 2022, each of which are hereby incorporated by reference in their entirety.

FIELD OF THE INVENTION

The present invention relates to a hydraulic valve assembly. In particular, the present invention relates to a hydraulic valve assembly having a connection section, a first valve section which can be pressurized via the connection section, and at least one second valve section which can be pressurized via the connection section. Furthermore, the invention relates to a mobile hydraulic system with a hydraulic valve assembly according to the invention and to a commercial vehicle with a mobile hydraulic system.

BACKGROUND OF INVENTION

Such valve assemblies are known from the prior art, for example from DE 10 2016 123 503 A1. The valve assembly shown there has a connection section and a first and a second valve section. The first valve section and the second valve section can be pressurized via the connection section so that hydraulic consumers connected to the respective valve section can be controlled. For this purpose, the first valve section has a first proportional spool, a first spool diverter, at least one consumer port of a first type of the first valve section and at least one consumer port of a second type of the first valve section. Correspondingly, the second valve section has a second proportional spool, a second spool shunt, at least one consumer port of the first type of the second valve section and at least one consumer port of the second type of the second valve section.

The first spool diverter and the second spool diverter are each switchable to at least a first spool diverter switching position and a second spool diverter switching position. When the first and second spool diverters are each in the first spool diverter switch position, the at least one consumer port of the first type of the first valve section and of the second valve section can be pressurized via the respective spool piston and the corresponding consumers can thus be controlled. When the first and second spool diverter are each in the second spool diverter switching position, the at least one consumer port of the second type of the first valve section and the second valve section can be pressurized via the respective spool piston and the corresponding consumers can thus be controlled.

In other words, a first group of hydraulic consumers is connected to the at least one consumer port of the first type of the first valve section and of the second valve section, and a second group of hydraulic consumers is connected to the at least one consumer port of the first valve section and of the second valve section. Explained using the example of a mobile hydraulic system, for example a forestry crane or a truck-mounted concrete pump, the hydraulic cylinders for controlling the mast or boom are combined in the first group, whereas the hydraulic cylinders for controlling the supports are combined in the second group.

Not least for safety reasons, it is imperative that faulty controls are avoided i.e., that in the above example the supports are always controlled separately from the mast. In particular, the mast must only be controllable when the supports are fully extended and safe support of the forestry crane is ensured. Otherwise, a load picked up by the mast could cause the forestry crane to become unstable and, in the worst case, to flip over.

Therefore, DE 10 2016 123 503 A1 suggests that the first spool diverter and the second spool diverter move together, in particular via a coupling. This ensures that the first spool diverter and the second spool diverter are always together either in the first spool diverter switching position or in the second spool diverter switching position. In other words, only either the first group of hydraulic consumers (e.g. the hydraulic cylinders for moving the supports) or the second group of hydraulic consumers (e.g. the hydraulic cylinders for moving the mast) can be controlled at any one time.

Nevertheless, DE 10 2016 123 503 A1 only shows how to implement this joint movement of the first spool diverter and the second spool diverter with a mechanical coupling. It is therefore the objective of the present invention to provide a simpler, less expensive and more space-saving solution for the joint movement of the first and second spool diverter.

The solution of the problem is achieved with a hydraulic valve assembly according to embodiments described herein.

The hydraulic valve assembly according to the invention is distinguished from hydraulic valve assemblies known in the prior art in particular by the fact that the hydraulic valve assembly has a hydraulic pilot control device with a pilot valve device. The first spool diverter and the second spool diverter can be pressurized with pilot pressure via the hydraulic pilot control device. In a first switching position of the pilot valve device, pilot pressure can be applied to the first spool diverter and the second spool diverter in parallel for switching together into the respective first spool diverter switching position. Preferably, in a second switching position of the pilot valve device, pilot pressure is applied to the first spool diverter and the second spool diverter in parallel for switching together into the respective second spool diverter switching position.

In other words, according to the invention, the pilot pressure is applied via the pilot valve device to the corresponding end faces of the first and second spool diverter so that identical pilot pressure is applied to the first spool diverter and the second spool diverter which are thus also switched completely in parallel into the corresponding spool diverter switching position. Preferably, the first spool diverter and the second spool diverter are of identical design. This results in a particularly simple, cost-effective and space-saving solution for moving the first and second spool diverter together.

Preferably, the hydraulic pilot control device comprises a pilot control line, a return line, a first pilot branch and a second pilot branch. A pilot pressure in the first pilot branch switches the first spool diverter and the second spool diverter together into the respective first spool diverter switching position. A pilot pressure in the second pilot branch switches the first spool diverter and the second spool diverter together into the respective second spool diverter switching position. The pilot valve device is preferably configured in such a way that, in the first switching position, it applies pilot pressure to the first pilot branch and connects the second pilot branch to the return line. Furthermore, the pilot valve device is preferably configured in such a way that, in the second switching position, it applies pilot pressure to the second pilot branch and connects the first pilot branch to the return line. Based on the switching position of the pilot valve device, either the first pilot branch or the second pilot branch can thus be pressurized with pilot pressure, whereby the pilot branch that is not pressurized with pilot pressure is relieved via the return line to the tank. This results in a particularly simple design of the hydraulic pilot control device. The pilot valve device preferably comprises a first pilot valve and a second pilot valve. In the first switching position of the pilot valve device, the first pilot valve connects the first pilot branch to the pilot line and the second pilot valve connects the second pilot branch to the return line. In the second switching position of the pilot valve device, the first pilot valve connects the first pilot branch to the return line and the second pilot valve connects the second pilot branch to the pilot line. The first pilot valve and the second pilot valve are thus each designed as a 3/2-directional valve. However, it is also conceivable that the pilot valve device comprises a single 4/2-directional valve.

Preferably, the hydraulic valve assembly comprises a pressure line for pressurizing the first valve section and the second valve section, with a shut-off valve being disposed in the pressure line. The shut-off valve here serves as a redundant safety valve in that the pressure line is shut off in the event of a malfunction of a spool diverter. A malfunction can result, for example, from contaminated hydraulic fluid if a spool diverter is immobile due to this.

It is particularly preferable if the shut-off valve can be switched from a blocking position to an open position via the hydraulic pilot control device. Preferably, the shut-off valve can be switched from the blocking position to the open position via the hydraulic pilot control device, in that the hydraulic valve assembly has at least one shut-off valve pilot line via which pilot pressure can be applied to the shut-off valve in order to switch into a release switching position releasing the pressure line, the hydraulic pilot control device comprising a shut-off pilot valve, wherein the shut-off pilot valve is configured to connect the shut-off valve to the pilot line or the return line. Preferably, the shut-off pilot valve is not connected to the first pilot branch and the second pilot branch. In other words, the shut-off pilot valve is not intended to switch the spool diverters, but only to actuate the shut-off valve.

In particular, the shut-off valve is configured in such a way that it is preloaded into the blocking position, for example via a corresponding biasing device. In this context, it is preferable if the hydraulic pilot control device has at least one shut-off valve pilot line for switching the shut-off valve from the blocking position to the open position. Preferably, a pilot pressure can be applied to the at least one shut-off valve pilot line only when the first spool diverter and the second spool diverter are each in the first spool diverter switching position or when the first spool diverter and the second spool diverter are each in the second spool diverter switching position. In other words, a pilot pressure is only present in the shut-off valve pilot line when all of the spool diverters are in the same spool diverter switching position. If one of the spool diverters does not switch to the desired spool diverter switching position, and thus there is a control error, no pilot pressure is applied to the shut-off valve. The shut-off valve remains in the blocking position and the consumer ports cannot be pressurized. This ensures that a group of hydraulic consumers is not activated unintentionally, thus preventing dangerous situations.

Preferably, the at least one shut-off valve pilot line can be pressurized with pilot pressure via the first pilot branch and/or via the second pilot branch. Thus, the shut-off valve can be switched from the blocking position to the open position via the pilot valve device without the need for a further valve for pilot control of the shut-off valve.

Preferably, the at least one shut-off valve pilot line can be relieved via a relief line to the tank, the relief line preferably opening into the return line of the hydraulic pilot control device. In this way, a possible (pilot) pressure in the shut-off valve pilot line can be reliably relieved so that the shut-off valve switches to the blocking position. In this context, it is particularly preferable if a hydraulic resistor is disposed in the relief line, the hydraulic resistor preferably being a nozzle. This inevitably results in relief of the shut-off valve pilot line via the hydraulic resistor, so that no residual pressure can remain in the shut-off valve pilot line. This ensures that the shut-off valve switches reliably to the shut-off position.

Preferably, the first valve section comprises a first reset device, wherein the first reset device biases the first spool diverter to a third spool diverter switching position, wherein the first valve section comprises at least one consumer port of a third type of the first valve section. Preferably, the second valve section comprises a second reset device, wherein the second reset device biases the second spool diverter into a third spool diverter switching position, wherein the second valve section comprises at least one consumer port of a third type of the second valve section. The at least one consumer port of the third type of the first valve section can be pressurized via the first spool piston and/or the at least one consumer port of the third type of the second valve section can be pressurized via the second spool piston when the first spool diverter and/or the second spool diverter are each in the third spool diverter switching position. Thus, a third group of hydraulic consumers can always be controlled when no pilot pressure is applied to the hydraulic pilot control device. In this context, it is conceivable that the pilot pressure is signaled directly to the shut-off valve in order to switch the shut-off valve to the open position without a pilot pressure being signaled via the first pilot branch or the second pilot branch.

Furthermore, the solution of the problem succeeds with a mobile hydraulic system according to claim 13 and a commercial vehicle with such a mobile hydraulic system according to claim 14. The mobile hydraulic system according to the invention comprises a hydraulic valve assembly described above. Further, the mobile hydraulic system preferably comprises at least a first group of hydraulic consumers and a second group of hydraulic consumers. The first group of hydraulic consumers is in particular connected to the at least one consumer port of the first type of the first valve section and to the at least one consumer port of the first type of the second valve section, and the second group of hydraulic consumers is in particular connected to the at least one consumer port of the first type of the first valve section and to the at least one consumer port of the second type of the second valve section.

DETAILED DESCRIPTION OF THE INVENTION

Figure 1:
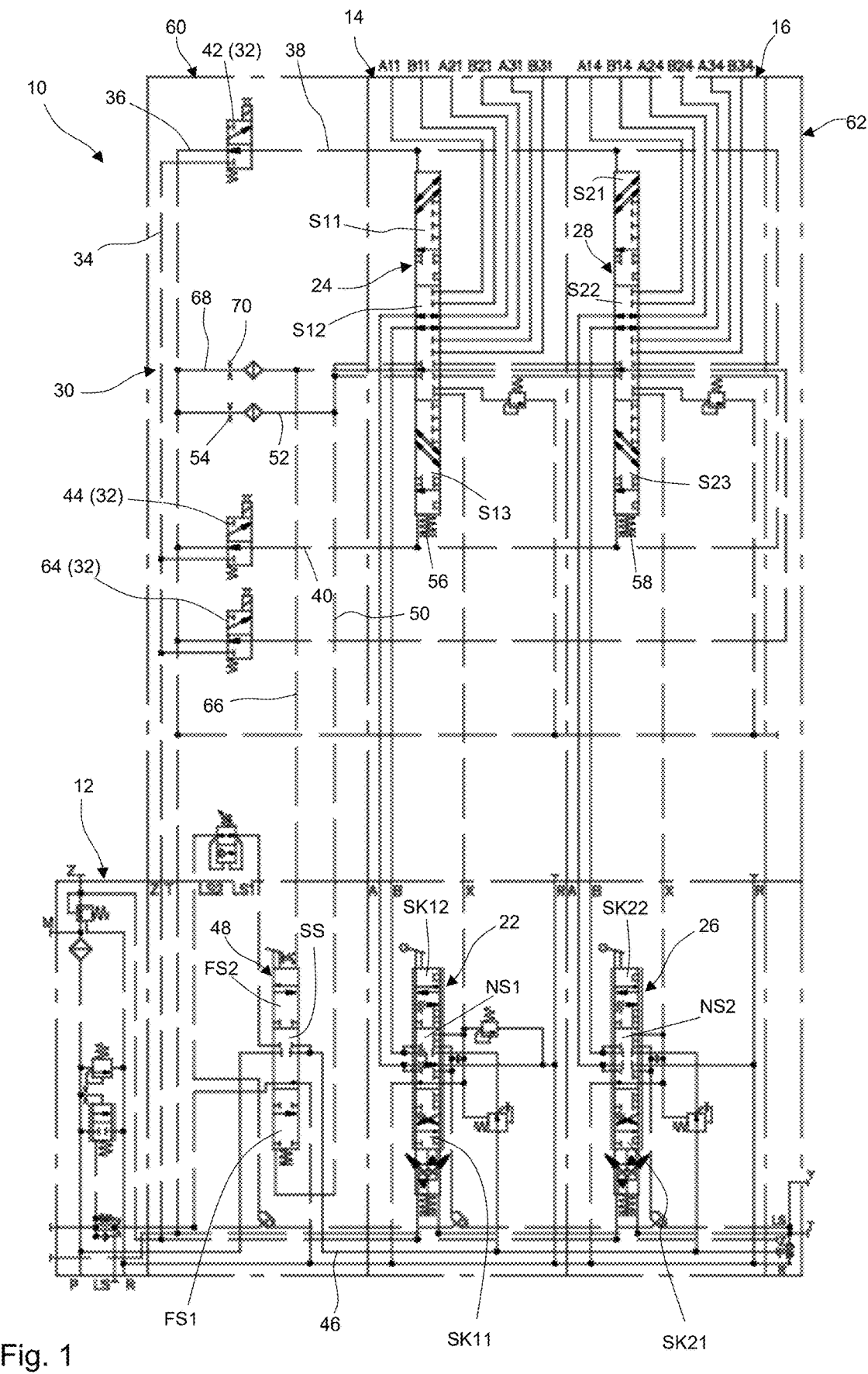
FIG. 1 is a hydraulic circuit diagram of a hydraulic valve assembly according to the invention in accordance with a first embodiment.

FIG. 1 depicts a hydraulic circuit diagram of a hydraulic valve assembly 10 according to the invention according to a first embodiment. The hydraulic valve assembly 10 comprises a connection section 12, an intermediate section 60, an end plate 62, and a first valve section 14 and a second valve section 16. The first valve section 14 and the second valve section 16 can be pressurized via the connection section 12 by a pressure line 46, as will be described in more detail below. For this purpose, a pressure source is connected to the port P of the connection section 12 in a known manner so that the pressure can be appropriately distributed via the pressure line 46. Therefore, the connection section 12 comprises a supply regulator. The supply regulator may be pressure compensator. As shown, the intermediate section 60 is disposed between the connection section 12 and the first valve section 14. Furthermore, the hydraulic valve assembly 10 comprises a tank line 88.

The first valve section 14 has a first proportional spool piston 22 and a first spool diverter 24. The first spool piston 22 can be proportionally deflected from a neutral position NS1 to a first spool piston switching position SK11 and a second spool piston switching position SK12 in a known manner to allow proportional pressurization via the pressure line 46 or proportional relief via the tank line 88.

Figure 3:
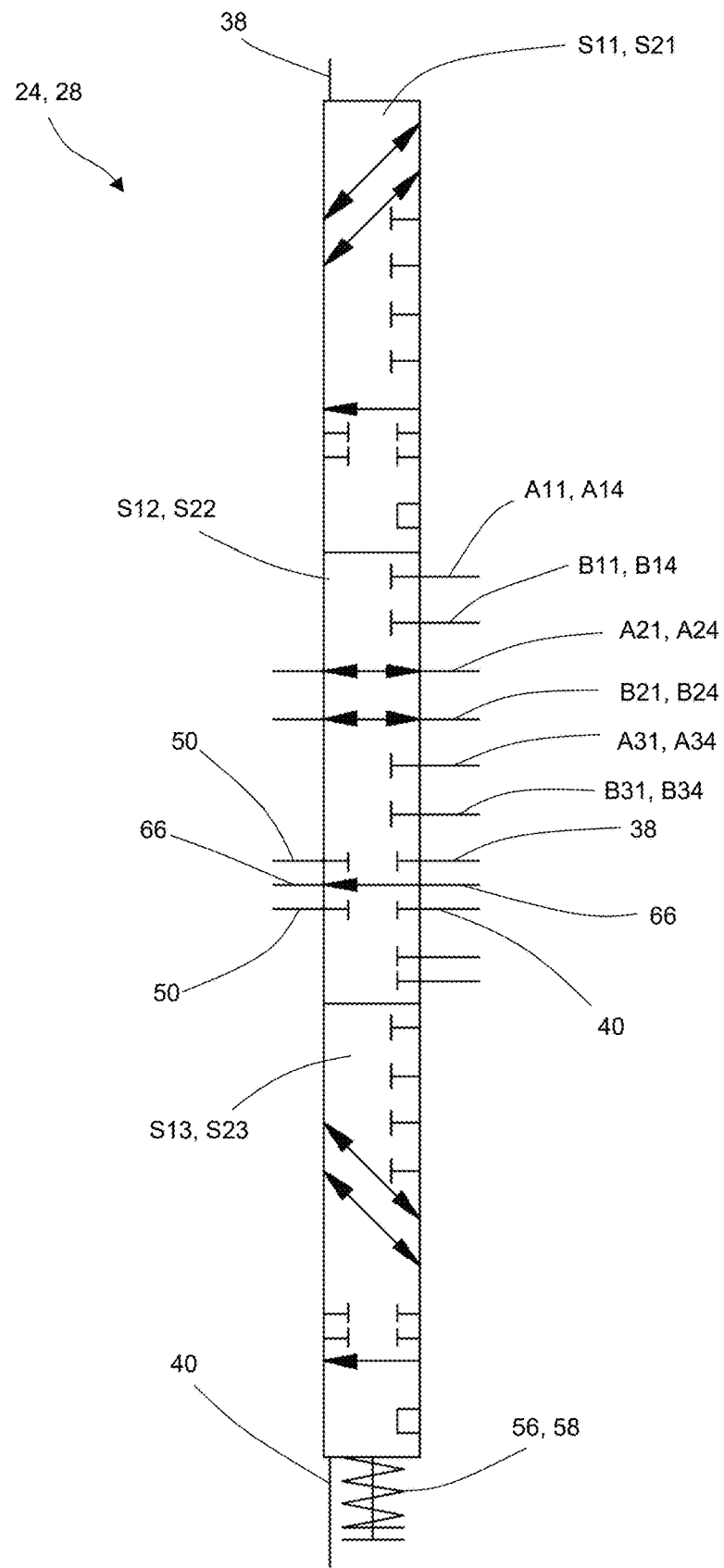
FIG. 3 is a detailed view of an 8/3-spool diverter shown in FIG. 1.

As also shown in particular in FIG. 3, the first spool diverter 24 is configured as an 8/3-spool diverter or an 8/3-directional valve respectively. In addition, the first valve section 14 comprises a total of six consumer ports A11 (first consumer port), B11 (second consumer port), A21 (third consumer port), B21 (fourth consumer port), A31 (fifth consumer port) and B31 (sixth consumer port) for connecting hydraulic consumers, which can be pressurized over the pressure line 46 or relieved to the tank R over the tank line 88 via proportional displacement of the first spool piston 22. The first consumer port A11 and the second consumer port B11 are also referred to as consumer ports of a first type of the first valve section 14. The fifth consumer port A31 and the sixth consumer port B31 are also referred to as consumer ports of a second type of the first valve section 14. The third consumer port A21 and the fourth consumer port B21 are also referred to as consumer ports of a third type of the first valve section 14. The first spool diverter 24 can be switched to a total of three switching positions S11, S12 and S13, namely to a first switching position S11, a second switching position S12 and a third switching position S13. A first reset device 56 maintains the first spool diverter 24 in the third switching position S13 as a neutral position. When the first spool diverter 24 is in the first switching position S11, the first consumer port A11 and the second consumer port B11 can be pressurized or relieved to the tank R via the spool piston 22, wherein the further consumer ports A21, B21, A31, and B31 are blocked. In the third switching position S13 of the first spool diverter 24, the third consumer port A21 and the fourth consumer port B21 can be pressurized or relieved to the tank R via the spool piston 22, with the further consumer ports A11, B11, A31 and B31 being blocked. In the second switching position S12 of the first spool diverter 24, the fifth consumer port A31 and the sixth consumer port B31 can be pressurized or relieved to the tank R via the spool piston 22, with the further consumer ports A11, B11, A21 and B21 being blocked.

The second valve section 16 is constructed in the same way as the first valve section 14 and has a second proportional spool piston 26 as well as a second spool diverter 28, which is also configured as an 8/3-spool diverter or an 8/3-directional valve respectively, cf. FIG. 3. The second spool piston 26 can be proportionally deflected from a neutral position NS2 to a first spool piston switching position SK21 and a second spool piston switching position SK22 in a known manner, to allow proportional pressurization via the pressure line 46 or proportional relief via the tank line 88.

The second valve section 16 also has a total of six consumer ports A14 (first consumer port), B14 (second consumer port), A24 (third consumer port), B24 (fourth consumer port), A34 (fifth consumer port) and B34 (sixth consumer port) for connecting hydraulic consumers, which can be pressurized via the pressure line 46 or relieved towards the tank R via the tank line 88 via a proportional displacement of the second spool piston 26. The first consumer port A14 and the second consumer port B14 are also referred to as consumer ports of a first type of the second valve section 16. The fifth consumer port A34 and the sixth consumer port B34 are also referred to as consumer ports of a second type of the second valve section 16. The third consumer port A24 and the fourth consumer port B24 are also referred to as consumer ports of a third type of the second valve section 16. In addition, the second spool diverter 28 can also be switched into a total of three switching positions S21, S22 and S23, namely into a first switching position S21, a second switching position S22 and a third switching position S23. The second spool diverter 28 is maintained in the third switching position S23 as a neutral position via a second reset device 58. When the second spool diverter 28 is in the first switching position S21, the first consumer port A14 and the second consumer port B14 can be pressurized or relived to the tank R via the second spool piston 26, and the other consumer ports A24, B24, A34 and B34 are blocked. When the second spool diverter 28 is in the third switching position S23, the third consumer port A24 and the fourth consumer port B24 can be pressurized or relived to the tank R via the second spool piston 26. In the third switching position S23, the further consumer ports A14, B14, A34 and B34 are blocked. When the second spool diverter 28 is in the second switching position S22, the fifth consumer port A34 and the sixth consumer port B34 can be pressurized or relived to the tank R via the second spool piston 26, with the other consumer ports A14, B14, A24 and B24 being blocked.

As shown in FIG. 1, the first spool piston 22 is configured in such a way that the consumer ports of the first valve section 14 (in FIG. 1, the third consumer port A21 and the fourth consumer port B21), which are currently controlled via the first spool diverter 24, are relieved to the tank R in the neutral position NS1 of the first spool piston 22. The second spool piston 28 is configured differently and blocks the consumer ports of the second valve section 16 (in FIG.

1, the third consumer port A24 and the fourth consumer port B24) that are currently controlled via the second spool piston 28. Due to the configuration of the first spool diverter 24 as an 8/3-directional valve, in combination with the three switching positions NS1, SK11 and SK12 of the first spool piston 22, there is an overall functionality of the first valve section 14 in the manner of an 8/9-directional valve, in particular a proportional valve, which enables a quantity control in the load pressure circuit independent of the load pressure. Correspondingly, the configuration of the second spool diverter 28 as an 8/3-directional valve in combination with the three switching positions NS2, SK21 and SK22 of the second spool piston 26 results in an overall functionality of the second valve section 16 in the manner of a particularly proportional 8/9-directional valve, which enables a load-pressure-independent flow control in the load pressure circuit.

In order to switch the first spool diverter 24 and the second spool diverter 28 together and in parallel, a hydraulic pilot control device 30 is disposed in the intermediate section 60. The hydraulic pilot control device 30 has a pilot line 34 and a return line 36. The pilot pressure to be applied is tapped directly downstream of the connection section 12 via the pilot line 34. The hydraulic pilot control device 30 further comprises a pilot valve device 32, via which pilot pressure can be applied to the first spool diverter 24 and the second spool diverter 28 in parallel in order to switch the first spool diverter 24 and the second spool diverter 28 together from the respective third switching position S13, S23 into the respective first switching position S11, S21 or into the respective second switching position S12, S22. For this purpose, the pilot valve device 32 can be switched to a first switching position, a second switching position or a third switching position. In the first switching position of the pilot valve device 32, a first pilot branch 38 of the hydraulic pilot device 30 is connected to the pilot line 34, and in the second switching position of the pilot valve device 32, a second pilot branch 40 of the hydraulic pilot device 30 is connected to the pilot line 34. Accordingly, the first pilot branch 38 is connected to the return line 36 in the second switching position of the pilot valve device 32 and the second pilot branch 40 is connected to the return line 36 in the first switching position of the pilot valve device 32.

To realize these switching positions, the pilot valve device 32 in this embodiment has a first pilot valve 42 and a second pilot valve 44, which connect the first pilot branch 38 and the second pilot branch 40 selectively either to the pilot line 34 or to the return line 36. The first pilot valve 42 and the second pilot valve 44 are each configured as solenoid-operated 3/2-directional valves. The first pilot valve 42 and the second pilot valve 44 are each biased via a corresponding biasing device in such a way that the first pilot branch 38 and the second pilot branch 40 are connected to the return line 36 in the de-energized state of the first pilot valve 42 and the second pilot valve 42 and are thus relieved. To switch the pilot valve device 32 to the first switching position, the first pilot valve 42 is energized so that the pilot line 34 is connected to the first pilot branch 38. The second pilot valve 44 remains de-energized. Accordingly, the second pilot valve 44 is energized to switch the pilot valve device 32 to the second switching position. The first pilot valve 42 is de-energized in the second switching position of the pilot valve device 32.

Furthermore, the hydraulic valve assembly 10 comprises a shut-off valve 48, which in this embodiment is part of the intermediate section 60. The shut-off valve 48 is disposed in the pressure line 46 between the connection section 12 and the first spool piston 22, and is biased by a corresponding spring device into a blocking position SS such that the pressure line 46 is blocked. In other words, unless the shut-off valve 48 is switched, the first valve section 14 and the second valve section 16 cannot be supplied with pressure. In this embodiment, the shut-off valve 48 is configured as a pilot-controlled 6/3-directional valve.

In order to switch the shut-off valve 48 to a first release switching position FS1 and to thus release the pressure line 46, the hydraulic pilot control device 30 comprises a first shut-off valve pilot line 50. As shown, the first shut-off valve pilot line 50 is pressurized via the first pilot branch 38 or the second pilot branch 40. For this purpose, the first pilot branch 38 is redirected in the end plate 62 and connected to the first shut-off valve pilot line 50 via the first spool diverter 24 and the second spool diverter 28, provided that the first spool diverter 24 and the second spool diverter 28 are in the first switching position S11, S21, respectively. If one of the two spool diverter valves 24, 28 is not in the first switching position S11, S21, the connection between the first pilot branch 38 and the shut-off valve pilot line 50 is blocked. Accordingly, the second pilot branch 40 is also redirected in the end plate 62 and connected to the first shut-off valve pilot line 50 via the first spool diverter 24 and the second spool diverter 28, provided that the first spool diverter 24 and the second spool diverter 28 are each in the third switching position S13, S23. When either of the spool diverter 24, 28 is not in the third switching position S13, S23, the connection between the second pilot branch 40 and the shut-off valve pilot line 50 is blocked. Thus, the pressure line 46 is released via the shut-off valve 48 only when the first spool diverter 24 and the second spool diverter 28 are in the actually desired switching position.

For example, if the pilot valve device 32 is switched to the first switching position to switch the first spool diverter 24 to the first switching position S11 and the second spool diverter 28 is also switched to the first switching position S21, the shut-off valve 48 is only switched when both spool diverters 24, 28 also switch to the first switching position S11, S21. If one of the two spool diverter valves 24,28 does not switch properly, the first pilot branch 38 is not connected to the first shut-off valve pilot line 50. The shut-off valve 48 remains in the biased blocking position SS blocking the pressure line 46. Consequently, the first valve section 14 and the second valve section 16 can only be supplied with pressure via the pressure line 46 if the spool diverters 24, 28 are correctly switched.

In order to also enable pressurization or depressurization of the corresponding hydraulic connections A21, B21, A24 and B24 of the first valve section 14 under second valve section 16 in the third switching position S13 of the first spool diverter 24 and the third switching position S23 of the second spool diverter 28, the hydraulic valve assembly 10 has a second shut-off valve pilot line 66, via which the shut-off valve 48 can also be pressurized with pilot pressure in order to be switched into a second release switching position FS2 releasing the pressure line 46. For this purpose, the pilot valve device 32 is switched to the third switching position. The second shut-off valve pilot line 66 is connected to the pilot line 34 or the return line 36 via a third pilot valve 64 in form of a shut-off pilot valve of the pilot valve device 32. In this exemplary embodiment, the third pilot valve 64 is configured as a solenoid-operated 3/2-directional valve and is biased via a corresponding biasing device in such a way that the second shut-off valve pilot line 66 is connected to the return line 36 in the de-energized state of the third pilot valve 64. If only the third pilot valve 64 is energized and consequently the pilot valve device 32 is switched to the third switching position, the pilot line 34 is connected to the second shut-off valve pilot line 66. As shown in FIG. 1, the second shut-off valve pilot line 66 is redirected in the end plate 62 and routed to the shut-off valve 48 via the first spool diverter 24 and the second spool diverter 28. When at least one of the two spool diverter valves 24, 28 is not in the third switching position S13, S23, the second shut-off valve pilot line 66 is blocked and the pilot pressure cannot be signaled to the shut-off valve 48. Consequently, the shut-off valve 48 is not switched to the second release switching position FS2, so that the pressure line 46 remains blocked. A pressure supply to the first valve section 14 and the second valve section 16 is therefore interrupted.

To ensure that the shut-off valve 48 is not rendered unswitchable due to a pressure trapped in the first shut-off valve pilot line 50, the first shut-off valve pilot line 50 is relieved to the tank R or return line R via a first relief line 52. As shown in FIG. 1, the first shut-off valve pilot line 50 is connected to the return line 36 of the hydraulic pilot device 30 via the first relief line 52. In this embodiment, the first relief line 52 branches off of the first shut-off valve pilot line 50 between the first spool diverter 24 and the shut-off valve 48. To ensure that sufficient pressure is present in the first shut-off valve pilot line 50 to safely switch the shut-off valve 48, a first hydraulic resistor 54 is disposed in the first relief line 52. In this embodiment, the first hydraulic resistor 54 is configured as a nozzle. Accordingly, the second shut-off valve pilot line 66 is also relieved to the tank R or return line R via a second relief line 68. The second relief line 68 branches off from the second shut-off valve pilot line 66 between the first spool diverter 24 and the shut-off valve 48 and opens into the return line 36. To ensure that a sufficient pressure for switching the shut-off valve 48 into the second release switching position FS2 is present in the second shut-off valve pilot line 66, a second hydraulic resistor 70 is disposed in the second relief line 68. The second hydraulic resistor 70 is also configured here as a nozzle. Via the first hydraulic resistor 54 and the second hydraulic resistor 70, a possibly trapped residual pressure in the first shut-off valve pilot line 50 or the second shut-off valve pilot line 66 is slowly relieved, so that the shut-off valve 48 switches reliably from the first release switching position FS1 or the second release switching position FS2 to the blocking position SS blocking the pressure line 46. The shut-off valve 48 and the corresponding signal of the pilot pressure can thus reliably exclude a faulty control.

Figure 2:
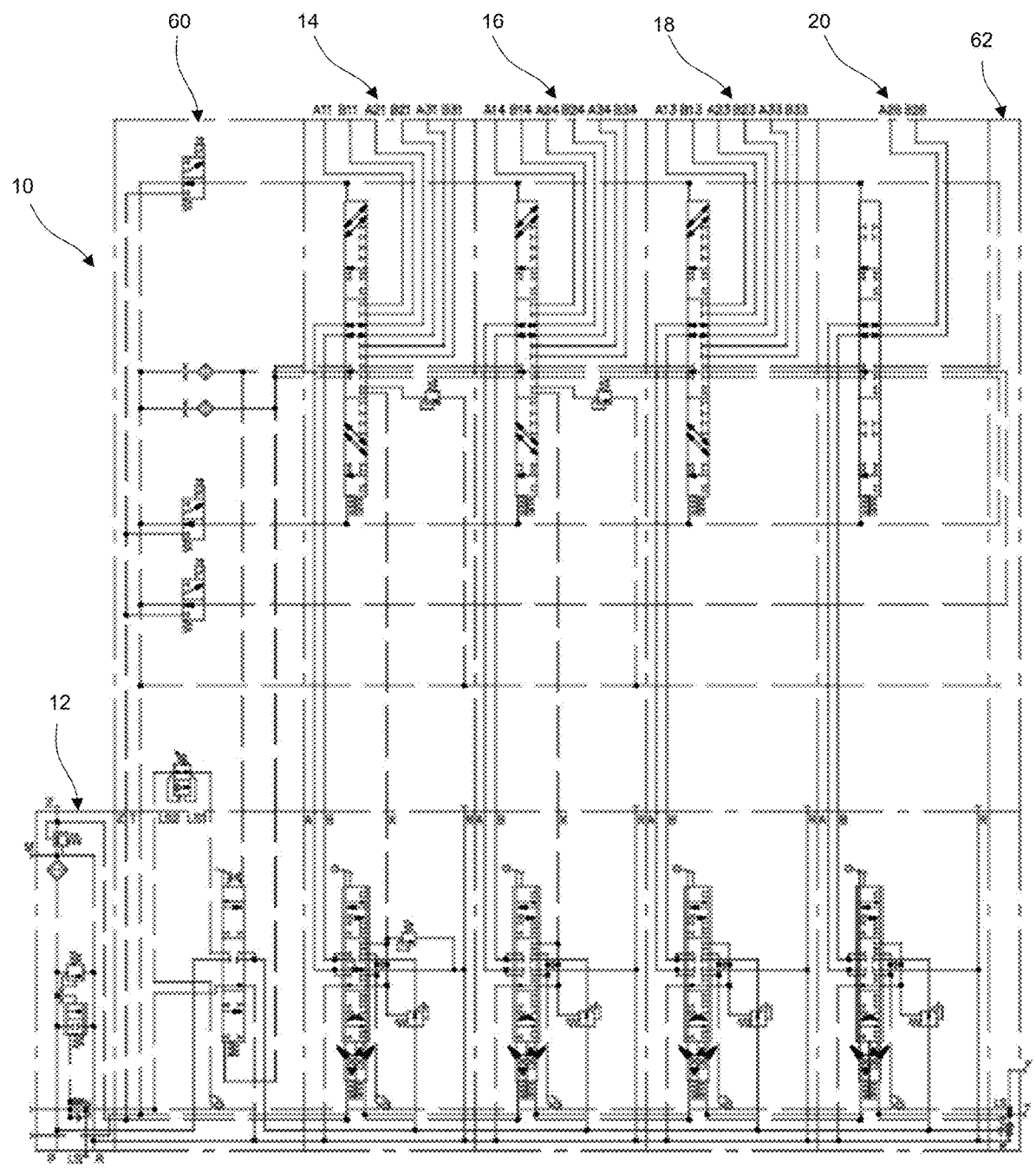
FIG. 2 is a variant of the hydraulic valve assembly shown in FIG. 1.

FIG. 2 shows a variant of the hydraulic valve assembly 10 shown in FIG. 1 as a hydraulic circuit diagram. The variant shown in FIG. 2 differs from the first embodiment shown in FIG. 1 in that a third valve section 18 and a fourth valve section 20 are also provided between the second valve section 16 and the end plate 62, via which the consumer ports A13, B13, A23, B23, A33, B33 and A26, B26 can be pressurized. The third valve section 18 and the fourth valve section 20 are basically constructed in the same way as the first valve section 14 and the second valve section 16. Consequently, the spool diverters of the third valve section 18 and the fourth valve section 20 are also switched together with the first spool diverter 24 and the second spool valve 28 from the second switching position into the first switching position or into the third switching position via the hydraulic pilot control device 30. Accordingly, pilot pressure is applied to the shut-off valve 48 via the first shut-off valve pilot line 50 or the second shut-off valve pilot line 66 and it is switched from the blocking position blocking the pressure line 46 into the first release switching position or into the second release switching position only when all the spool diverters of the first to fourth valve sections 14, 16, 18 and 20 are in the same switching position.

As shown in FIG. 2, it is not absolutely necessary for all spool diverters to be of identical design. In the variant shown in FIG. 2, the spool diverter of the fourth valve section 20 is configured in such a way that the only two consumer ports A26 and B26 of the fourth valve section 20 can be pressurized when the spool diverter of the fourth valve section 20 is in the second switching position. In this context, it should be noted that, in the sense of the invention, all combinations of valve sections are generally possible. For example, a variant is also conceivable in which a valve section has only two consumer ports which can be pressurized in the first switching position or in the second switching position of the spool diverter.

Furthermore, the first spool piston 22 in FIG. 2 is configured in such a way that the consumer ports controlled via the first spool diverter 24 are blocked in the neutral position NS1 of the first spool piston 22. Further, the second spool piston 26 is configured in such a way that the consumer ports currently controlled via the second spool diverter 28 are relieved to the tank R in the neutral position NS2 of the second spool piston 26.

Figure 4:
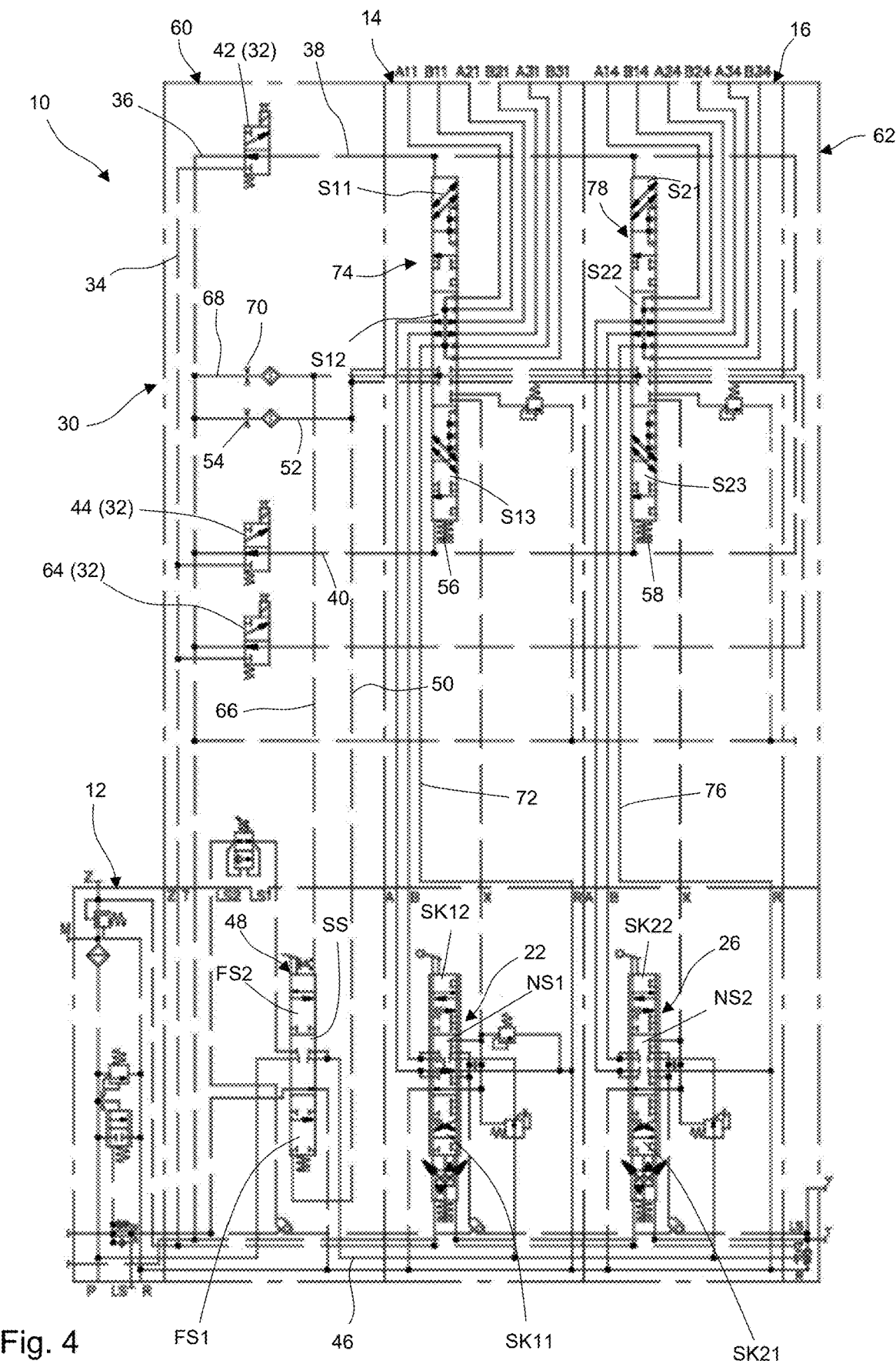
FIG. 4 is a hydraulic circuit diagram of a hydraulic valve assembly according to the invention in accordance with a second embodiment.

FIG. 4 shows a hydraulic circuit diagram of a hydraulic valve assembly 10 according to the invention in accordance with a second embodiment. The hydraulic valve assembly 10 according to the second embodiment differs from the hydraulic valve assembly according to the first embodiment shown in FIGS. 1 to 3 in that the consumer ports which are not pressurized are not blocked, but are relieved via the first spool diverter 74 of the first valve section 14 and the second spool diverter 78 of the second valve section 16 to the return line R. In the following, for reasons of clarity, only the differences between the hydraulic valve assembly 10 according to the first embodiment and the hydraulic valve assembly 10 according to the second embodiment will be described.

In other words, when the first spool diverter 74 and the second spool diverter 78 are in the second switching position S12, S22, the third and fourth consumer ports A21, B21 of the first valve section 14 and the third and fourth consumer ports A24, B24 of the second valve section 16 can be pressurized or relieved to the return line R, respectively. The first, second, fifth and sixth consumer ports A11, B11, A31 and B31 of the first valve section 14 and the first, second, fifth and sixth consumer ports A14, B14, A34 and B34 of the second valve section 16 are not blocked, but are relieved to the return line R via the first spool diverter 74 and the second spool diverter 78, respectively.

For this purpose, the first valve section 12 comprises a first main return line 72, via which the consumer ports that cannot be pressurized via the first spool piston 22 are collectively relieved toward the return line R. As shown in particular in FIG. 5, the first spool diverter 74 has a first collecting channel 80 for this purpose for each of the three switching positions S11, S12 and S13, which connects the consumer ports not connected to the first spool piston 22 to the first main return line 72. The first collecting channel 80 is configured in such a way that the consumer ports connected to it are throttled by a first throttle 82 and relieved via the first main return line 72.

Accordingly, the second valve section 16 comprises a second main return line 76, via which the consumer ports that cannot be pressurized via the second spool piston 26 are collectively relieved towards the return line R. For this purpose, the second spool diverter 78 has a second collecting channel 84 for each of the three switching positions S21, S22 and S23, which connects the consumer ports not connected to the second spool piston 26 to the second main return line 76 and which are thus relieved to the tank. The second collecting channel 84 is configured in such a way that the consumer ports connected to it are throttled by a second throttle 86 and relieved to the return line R via the second return collecting channel 76.

Figure 5:
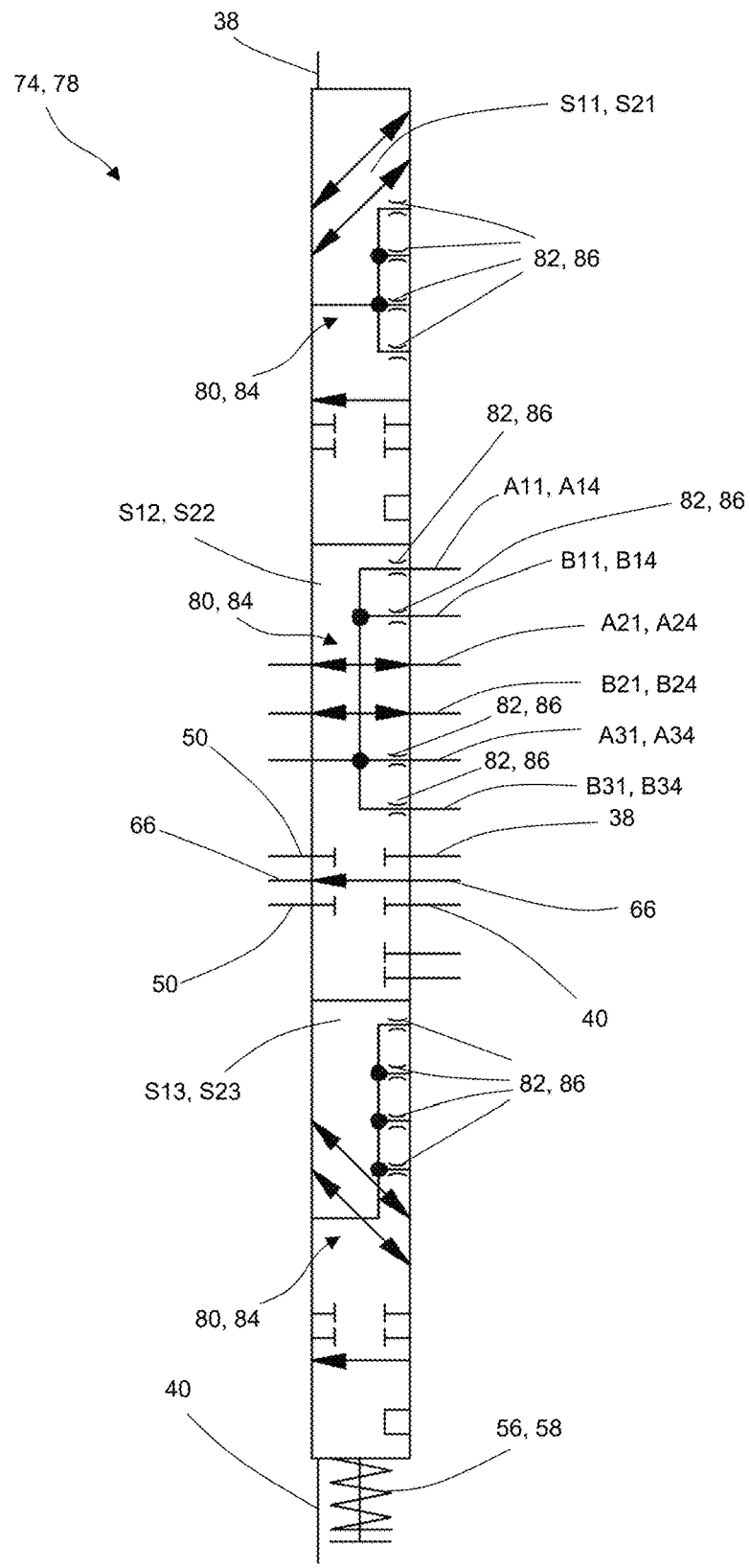
FIG. 5 is a detailed view of an 8/3-spool diverter shown in FIG. 4.

The first throttle 82 and the second throttle 86 can be implemented via a hydraulic resistor for each of the connected consumer ports, as shown in FIG. 5. Alternatively, of course, central throttling can also be implemented for each of the connected consumer ports.

Figure 6:
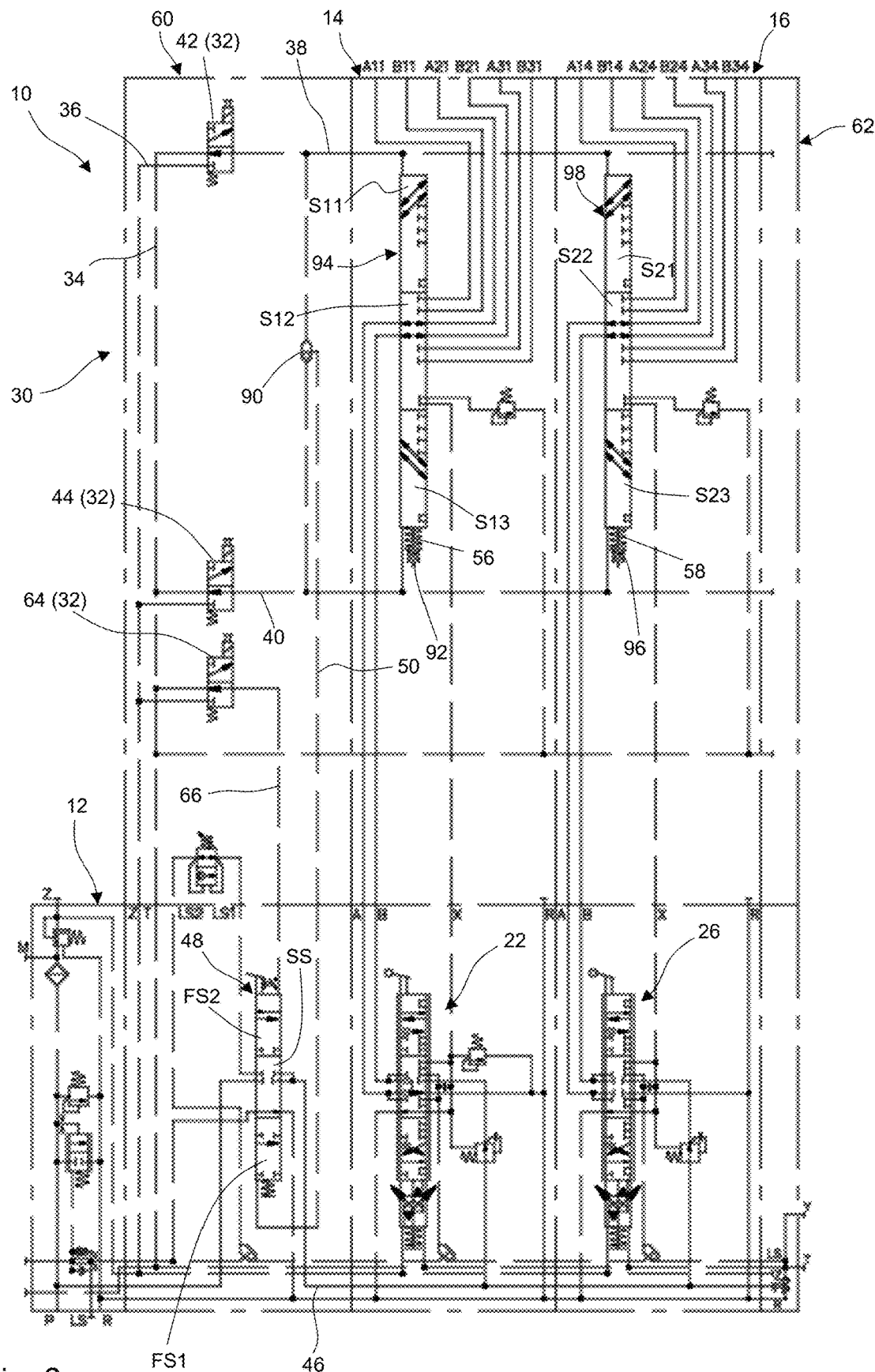
FIG. 6 is a hydraulic circuit diagram of a hydraulic valve assembly according to the invention in accordance with a third embodiment.
Figure 7:
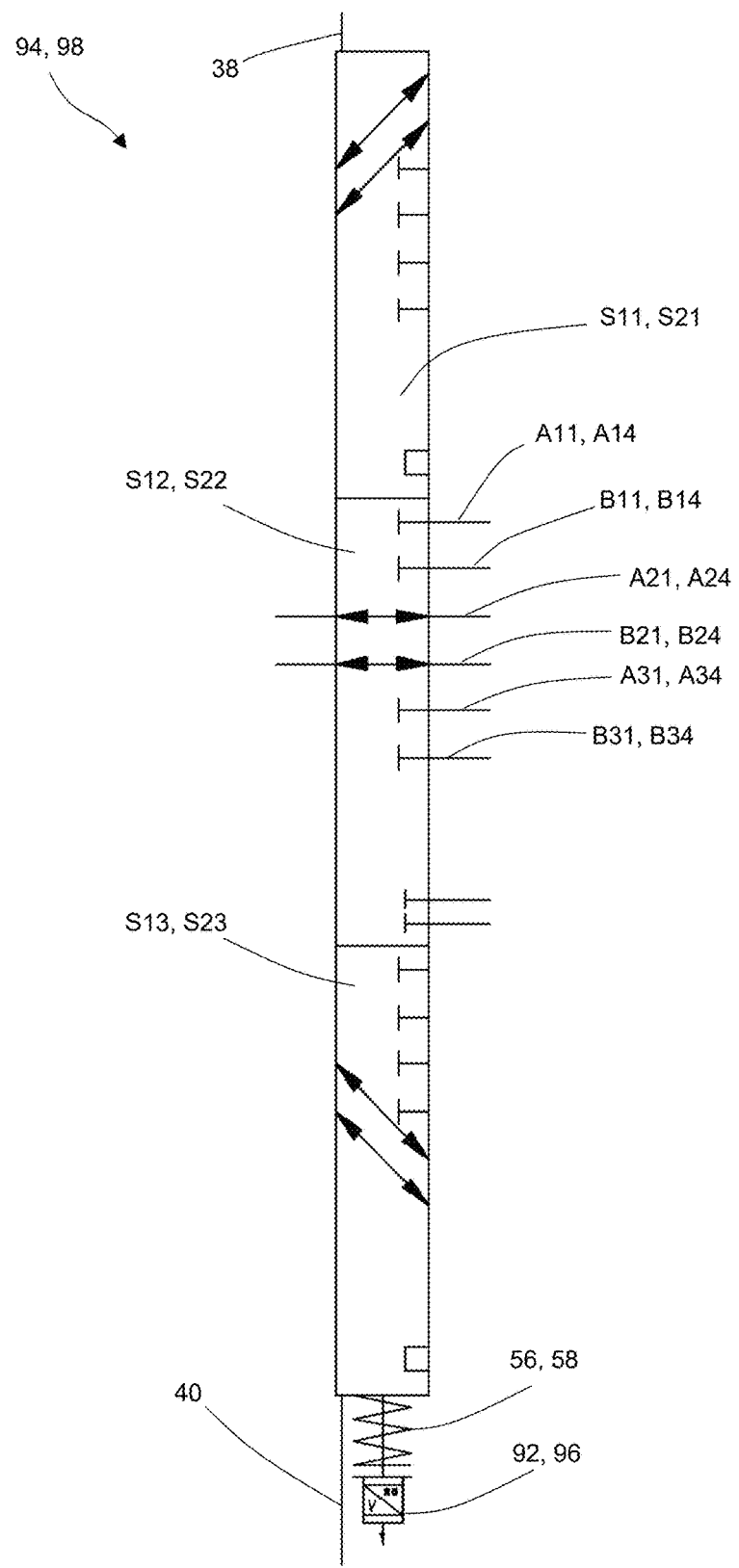
FIG. 7 is a detailed view of an 8/3-spool diverter shown in FIG. 6.

In FIGS. 6 and 7, a third embodiment of a hydraulic valve assembly 10 is shown. This embodiment differs from the hydraulic valve assembly according to the first embodiment in that the pilot pressure is signaled directly to the shut-off valve 48 via the pilot valve device 32 and the first and second pilot branches 38, 40 are not redirected in the end plate 62 but terminate there. Accordingly, the second shut-off valve pilot line 66 is also not redirected in the end plate 62, but is directly connected to the shut-off valve 48 in the intermediate section 60.

In addition, the first spool diverter 94 has a first position sensor 92 and the second spool diverter 98 has a second position sensor 96. The first position sensor 92 and the second position sensor 96 transmit a corresponding position signal of the first spool diverter 94 and the second spool diverter 98 to a (not shown) higher-level controller. Thus, it can be determined whether the first spool diverter 94 and the second spool diverter 98 are each in the same switching position, and a faulty control can be reliably excluded.

The first pilot branch 38 and the second pilot branch 40 are connected to the first shut-off valve pilot line 50 via a selector valve 90. When the pilot valve device 32 is switched to the first switching position to switch the first spool branch 94 and the second spool branch 98 together to the first switching position S11, S21, the first pilot valve 42 is energized. The second pilot valve 44 remains de-energized, so that the second pilot branch 40 is connected to the return line 36. Accordingly, the third pilot valve 64 also remains de-energized, so that the second shut-off valve pilot line 66 is connected to the return line 36. This corresponds to the first switching position of the pilot valve device 32. Consequently, the first pilot branch 38 is connected to the pilot line 34 and the first spool diverter 94 and the second spool diverter 98 are moved together against the first reset device 56 and against the second reset device 58 from the third switching position S13, S23 to the first switching position S11, S21. At the same time, the pilot pressure from the pilot line 34 is signaled via the selector valve 90 and the first shut-off valve pilot line 50 to the shut-off valve 48, which is switched from the blocking position SS to the first release switching position FS1 and releases the pressure line 46. Any residual pressure present in the second shut-off valve pilot line 66 can be relieved directly to the tank R via the return line 36.

When the first spool diverter 94 and the second spool diverter 98 are to be switched together to the second switching position S12, S22, the second pilot valve 44 is energized and the first pilot valve 42 and the third pilot valve 64 remain de-energized. This corresponds to the second switching position of the pilot valve device 32. Consequently, the second pilot branch 40 is connected to the first shut-off valve pilot line 50 via the selector valve 90. The first pilot branch 38 and the second shut-off valve pilot line 66 are connected to the return line 36, so that any residual pressure is relieved directly to the tank R. The shut-off valve 48 is switched to the first release switching position FS1 and the pressure line 46 is released.

To switch the first spool diverter 94 and the second spool diverter 98 together to the third switching position S13, S23, the third pilot valve 64 is energized. The first pilot valve 42 and the second pilot valve 44 remain de-energized. This corresponds to the third switching position of the pilot valve device 32. Thus, the first pilot branch 38 and the second pilot branch 40 are connected to the return line 36. Since there is thus no pilot pressure at the first spool valve branch 94 and the second spool valve branch 98, these are switched to the third switching position S13, S23 via the first reset device 56 and the second reset device 58, respectively. At the same time, the pilot pressure from the pilot line 34 is signaled to the shut-off valve 48 via the third pilot valve 64 and the second shut-off valve pilot line 66. The shut-off valve 48 thus switches to the second release switching position FS2 and releases the pressure line 46.

Figure 8:
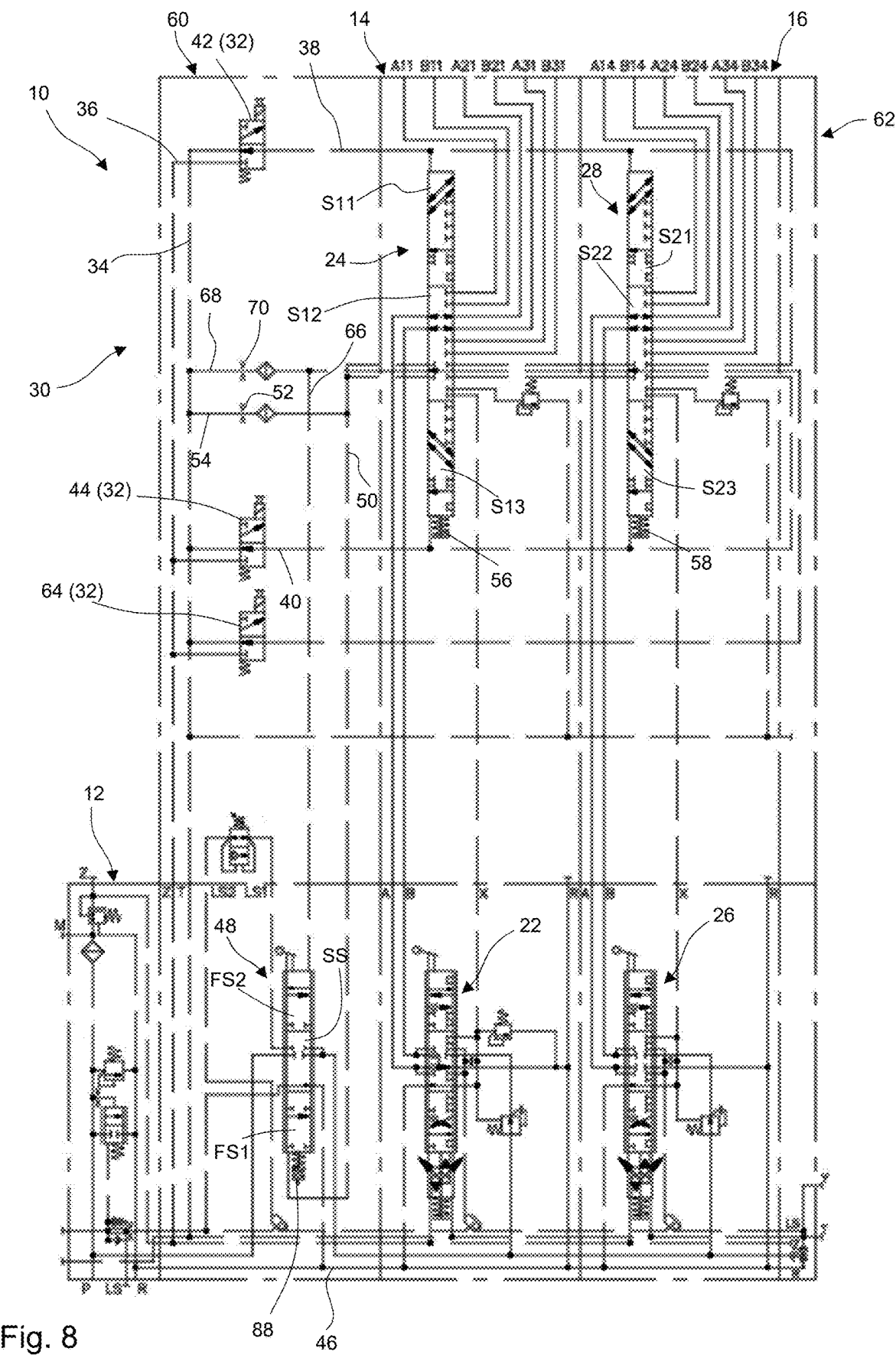
FIG. 8 is a hydraulic circuit diagram of a hydraulic valve assembly according to the invention in accordance with a fourth embodiment.

FIG. 8 shows a hydraulic valve assembly 10 according to a fourth embodiment. The hydraulic valve assembly 10 according to the fourth embodiment differs from the hydraulic valve assembly shown in FIG. 1 in the configuration and actuation of the shut-off valve 48. In this embodiment, the shut-off valve 48 is a proportional valve with three switching positions, wherein the shut-off valve is biased into the blocking position SS via the biasing device. Further, the shut-off valve 48 comprises a proportionally measuring displacement transducer 89.

In this embodiment, the pilot valve device 32 is configured such that the pilot pressure for switching the first spool diverter 24 and the second spool diverter 28 to the respective first spool diverter switching position S11, S21 is different from the pilot pressure for switching the first spool diverter 24 and the second spool diverter 28 to the respective second spool diverter switching position S12, S22. Thus, depending on the spool diverter switching position, a different pilot pressure is applied via the first shut-off valve pilot line 50 to the shut-off valve 48 for switching to the first release switching position FS1. In other words, the stroke of the shut-off valve 48 for switching to the first release switching position FS1 depends on whether the first consumer ports A11, B11, A14 and B14 or the third consumer ports A31, B21, A34 and B34 of the respective valve sections 14, 16 are controlled via the first spool piston 24 and the second spool piston 28. The proportional stroke of the shut-off valve 48 can be determined via the displacement transducer 89, so that it is also possible to distinguish the prevailing spool diverter switching position within the first release switching position FS1.

It is conceivable, for example, that a pressure of 15 bar can be applied via the pilot valve device 32 to the first pilot branch 38 for switching the first spool diverter 24 and the second spool diverter 28 into the respective first spool diverter switching position S11, S21. Accordingly, a pressure of 18 bar, for example, can be applied via the pilot valve device 32 to the second pilot branch 40 for switching the first spool diverter 24 and the second spool diverter 28 into the respective second spool diverter switching position S12, S22. So that the first spool diverter 24 and the second spool diverter 28 switch reliably irrespective of the different pilot pressures, the first reset device 56 and the second reset device 58 are adapted to the correspondingly different pilot pressures. It is possible that the first pilot valve 42 and the second pilot valve 44 are also configured as proportional valves so as to apply the different pilot pressures to the respective pilot branch 38, 40.

In both cases, the shut-off valve 48 switches to the first release switching position FS1, but with a different stroke in each case, which is detected via the displacement transducer 89. The shut-off valve 48 is preferably configured in such a way that the quantity flowing via the shut-off valve 48 is independent of the stroke in the first release switching position FS1, but in both cases corresponds at least to the maximum quantity required to control the correspondingly connected hydraulic consumers.

Figure 9:
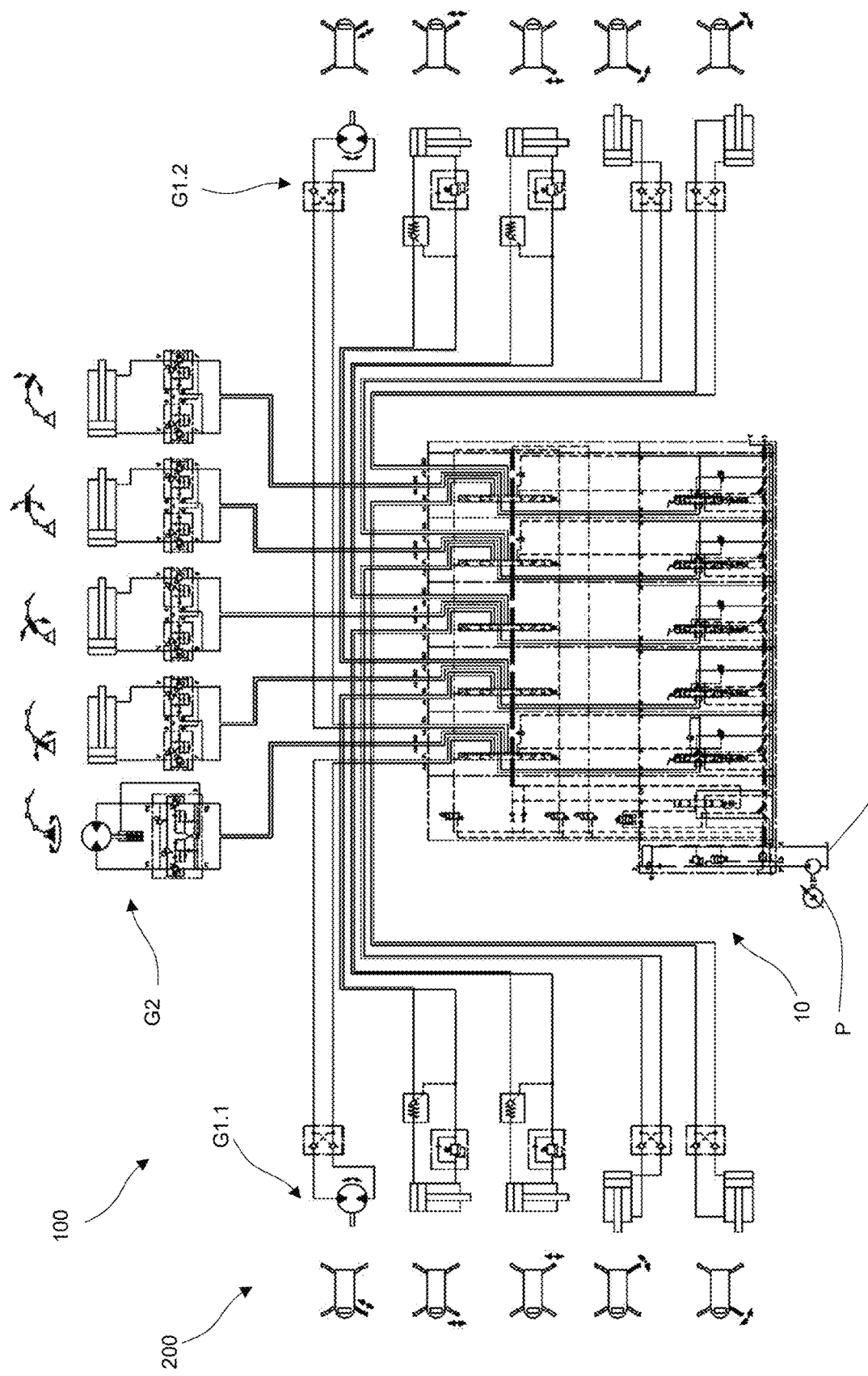
FIG. 9 is an illustration of a commercial vehicle with a mobile hydraulic system comprising a hydraulic valve assembly according to the invention.

In FIG. 9, a commercial vehicle 200 is shown schematically, which has a mobile hydraulic system 100, a mast and supports. The mobile hydraulic system 100 comprises a pump P, a tank R, a hydraulic valve assembly 10 described above, and a plurality of hydraulic consumers connected to the hydraulic valve assembly 10 in a known manner. In this exemplary embodiment, the hydraulic valve assembly comprises a total of five valve sections. In this exemplary embodiment, the hydraulic consumers are grouped into three groups. In the first group G1, for example, the hydraulic consumers of the left-hand supports are grouped together, in the second group G2, for example, the hydraulic consumers of the right-hand supports are grouped together, and in the third group G3, for example, the hydraulic consumers of the mast are grouped together. The first group G1 of hydraulic consumers is connected to the first and second consumer ports of the respective valve section. The third group G3 of hydraulic consumers is connected to the third and fourth consumer ports of the respective valve section, and the second group G2 of hydraulic consumers is connected to the fifth and sixth consumer ports of the respective valve section.

To control the first group G1, the spool diverters of the five valve sections are switched together to the first switching position S11, S21, . . . . The other groups G2 and G3 are blocked. Accordingly, the spool diverters of the five valve sections are switched together into the second switching position S12, S22, . . . in order to control the second group G2 of hydraulic consumers. The first group G1 and the third group G3 are blocked. In order to control the third group G3 of hydraulic consumers, the spool diverters of the five valve sections are switched together to the third switching position S13, S23, . . . . The first group G1 and the second group G2 are blocked. Based on the resulting position of the shut-off valve 48 in the first release switching position FS1 or in the second release switching position FS2, it can be reliably derived whether the supports (in the first group G1 and the second group G2) or the mast (in the third group G3) are currently being controlled.

According to the present invention, of course, any number of valve sections may be used, depending on the requirements of the mobile hydraulic system 100. Also, the embodiments may be combined with each other. For example, it is conceivable for a hydraulic valve assembly 10 to have a first spool piston 24 in the first valve section 14 in accordance with the first embodiment and to have a spool piston 74 in the second valve section 16 in accordance with the second embodiment. Finally, it should also be pointed out that the terms used herein, such as "first", "second" or "third", do not specify a specific order, but serve exclusively to separate and distinguish elements and features.

Exemplary Embodiments

As already described, the technology described herein may be implemented in various ways. In that regard, the foregoing disclosure is intended to include, but not be limited to, the systems, methods, and combinations and sub combinations thereof that are set forth in the following exemplary implementations. Preferred embodiments are described in the following paragraphs:

A1 Hydraulic valve assembly (10) having a connection section (12), a first valve section (14) which can be pressurized via the connection section (12), and at least one second valve section (16) which can be pressurized via the connection section (12), wherein the first valve section (14) comprises a first spool piston (22), a first spool diverter (24, 74, 94), at least one consumer port of a first type (A11, B11) of the first valve section (14), and at least one consumer port of a second type (A31, B31) of the first valve section (14), and wherein the second valve section (16) comprises a second spool piston (26), a second spool diverter (28, 78, 98), at least one consumer port of a first type (A14, B14) of the second valve section (16), and at least one consumer port of a second type (A34, B34) of the second valve section (16), and the first spool diverter (24, 74, 94) and the second spool diverter (28, 78, 98) can each be switched at least into a first spool diverter switching position (S11, S21) and a second spool diverter switching position (S12, S22), so that the at least one consumer port of the first type (A11, B11) of the first valve section (14) can be pressurized via the first spool (22) and the at least one consumer port of the first type (A14, B14) of the second valve section (16) can be pressurized via the second spool (26) when the first spool (24, 74, 94) and the second spool (28, 78, 98) are each in the first spool diverter switching position (S11, S21), and so that the at least one consumer port of the second type (A31, B31) of the first valve section (14) can be pressurized via the first spool piston (22) and the at least one consumer port of the second type (A34, B34) of the second valve section (26) can be pressurized via the second spool piston (26) when the first spool diverter (24, 74, 94) and the second spool diverter (28, 78, 98) are each in the second spool diverter switching position (S12, S22), wherein the hydraulic valve assembly (10) has a hydraulic pilot control device (30) with a pilot valve device (32), wherein pilot pressure can be applied to the first spool diverter (24, 74, 94) and the second spool diverter (28, 78, 98) via the hydraulic pilot control device (30), wherein pilot pressure is applied in parallel to the first spool diverter (24, 74, 94) and the second spool diverter (28, 78, 98) in a first switching position of the pilot valve device (32) for switching together into the respective first spool diverter switching position (S11, S21).

A2 Hydraulic valve assembly (10) according to paragraph A1, wherein pilot pressure is applied in parallel to the first spool diverter (24, 74, 94) and the second spool diverter (28, 78, 98) in a second switching position of the pilot valve device (32) for parallel switching together case into the second spool diverter switching position (S12, S22).

A3 Hydraulic valve assembly (10) according to paragraph A2, wherein the hydraulic pilot control device (30) comprises a pilot line (34), a return line (36), a first pilot branch (38) and a second pilot branch (40), wherein a pilot pressure in the first pilot branch (38) switches the first spool diverter (24, 74, 94) and the second spool diverter (28, 78, 98) together into the respective first spool diverter switching position (S11, S12), wherein a pilot pressure in the second pilot branch (40) switches the first spool diverter (24, 74, 94) and the second spool diverter (28, 78, 98) together into the respective second spool diverter switching position (S12, S22), wherein the pilot valve device (32) in the first switching position applies pilot pressure to the first pilot branch (38) and connects the second pilot branch (40) to the return line (36), and wherein the pilot valve device (32) in the second switching position applies pilot pressure to the second pilot branch (40) and connects the first pilot branch (38) to the return line (36).

A4 Hydraulic valve assembly (10) according to paragraph A4, wherein the pilot valve device (32) comprises a first pilot valve (42) and a second pilot valve (44), wherein in the first switching position of the pilot valve device (32), the first pilot valve (42) connects the first pilot branch (38) to the pilot line (34) and the second pilot valve (44) connects the second pilot branch (40) to the return line (36), and wherein in the second switching position of the pilot valve device (32), the first pilot valve (42) connects the first pilot branch (38) to the return line (36) and the second pilot valve (42) connects the second pilot branch (40) to the pilot line (34).

A5 Hydraulic valve assembly (10) according to any one of the preceding paragraphs A1 to A4, wherein the hydraulic valve assembly (10) comprises a pressure line (46) for pressurizing the first valve section (14) and the second valve section (16), wherein a shut-off valve (48) is disposed in the pressure line (46).

A6 Hydraulic valve assembly (10) according to paragraph A5, wherein the shut-off valve (48) can be switched from a blocking position to an open position via the hydraulic pilot control device (30).

A7 Hydraulic valve assembly (10) according to paragraph A6, wherein the shut-off valve (48) can be switched from the blocking position (SS) to the open position (FS1, FS2) via the hydraulic pilot control device (30), in that the hydraulic valve assembly (10) comprises at least one shut-off valve pilot line (66) via which pilot pressure can be applied to the shut-off valve (48) in order to switch into an open position (FS1, FS2) releasing the pressure line, the hydraulic pilot control device (30) comprising a shut-off pilot valve (64), wherein the shut-off pilot valve (64) is configured to connect the shut-off valve (48) to the pilot line (66) or the return line (36).

A8 Hydraulic valve assembly (10) according to paragraph A6 o A7, wherein the hydraulic pilot control device (30) has at least one shut-off valve pilot line (50) for switching the shut-off valve (48) from the blocking position to the open position, wherein a pilot pressure is applied to the at least one shut-off valve pilot line (50) only when the first spool diverter (24, 74) and the second spool diverter (28, 78) are each in the first spool diverter switching position (S11, S21) or when the first spool diverter (24, 74) and the second spool diverter (28, 78) are each in the second spool diverter switching position (S12, S22).

A9 Hydraulic valve assembly (10) according to paragraph A8, wherein the at least one shut-off valve pilot line (50) can be pressurized with pilot pressure via the first pilot branch (38) and/or via the second pilot branch (40).

A10 Hydraulic valve assembly (10) according to any one of paragraph A7 to A9, wherein the at least one shut-off valve pilot line (50, 66) can be relieved to the tank (R) via a relief line (52, 68), the relief line (52, 68) preferably opening into the return line (36) of the hydraulic pilot control device (30).

A11 Hydraulic valve assembly (10) according to paragraph A10, wherein a hydraulic resistor (54, 70) is disposed in the relief line (52, 68), wherein the hydraulic resistor (54, 70) is preferably a nozzle.

A12 Hydraulic valve assembly (10) according to any one of the preceding paragraphs A1 to A11, wherein the first valve section (14) comprises a first reset device (56), wherein the first reset device (56) biases the first spool diverter (24, 74, 94) into a third spool diverter position (S13), wherein the first valve section (14) comprises at least one consumer port of a third type (A21, B21) of the first valve section (14), and/or the second valve section (16) has a second reset device (58), the second reset device (58) biasing the second spool diverter (28, 78, 98) into a third spool diverter switching position (S23), the second valve section (16) having at least one consumer port of a third type (A24, B24) of the second valve section (16), and wherein the at least one consumer port of the third type (A21, B21) of the first valve section (14) can be pressurized via the first spool piston (22) and/or the at least one consumer port of the third type (A24, B24) of the second valve section (16) can be pressurized via the second spool piston (26) when the first spool diverter (24, 74) and/or the second spool diverter (28, 78, 98) are each in the third spool diverter switching position (S13, S23).

A13 Mobile hydraulic system with a hydraulic valve assembly (10) according to one of the previous claims, wherein the mobile hydraulic system preferably has at least a first group (G1) of hydraulic consumers and a second group (G2) of hydraulic consumers, wherein the first group (G1) of hydraulic consumers is connected in particular to the at least one consumer port of the first type (A11, B11) of the first valve section (14) and to the at least one consumer port of the first type (A14, B14) of the second valve section (16), and the second group (G2) of hydraulic consumers being connected in particular to the at least one consumer port of the second type (A31, B31) of the first valve section (14) and to the at least one consumer port of the second type (A34, B34) of the second valve section (16).

A14 Commercial vehicle having a mobile hydraulic system according to paragraph A13.s B1 A hydraulic valve assembly (10) comprising a connection section (12), a first valve section (14) and a pressure line (46), wherein the first valve section (14) can be pressurized by the connection section (12) via the pressure line (46), wherein the first valve section (14) comprises a first spool piston (22), a first spool diverter (24, 74, 94), at least one first consumer port (A11, B11) of the first valve section (14), and at least one second consumer port (A21, B21) of the first valve section (14), wherein a first group (G1.1) of hydraulic consumers can be controlled via the at least one first consumer port (A11, B11) of the first valve section (14), wherein a second group (G2) of hydraulic consumers can be controlled via the at least one second consumer port (A21, B21) of the first valve section, wherein the first spool diverter (24, 74, 94) can be switched at least into a first spool diverter switching position (S11) and a second spool diverter switching position (S12), so that the first group (G1.1) of hydraulic consumers can be controlled via the first spool piston (22) when the first spool diverter (24, 74, 94) is in the first spool diverter switching position (S11), and so that the second group (G2) of hydraulic consumers can be controlled via the first spool (22) when the first spool diverter (24, 74, 94) is in the second spool diverter switching position (S12), and wherein a shut-off valve (48) is disposed in the pressure line (46), and the shut-off valve (48) blocks the pressure line (46) in a blocking position (SS), wherein the shut-off valve (48) can be switched from the blocking position (SS) into a first release switching position (FS1) and a second release switching position (FS2), the pressure line (46) being released in the first release switching position (FS1) and in the second release switching position (FS2), wherein the shut-off valve (48) switches to the first release switching position (FS1) when the first spool diverter (24, 74, 94) is in the first spool diverter switching position (S11), and wherein the shut-off valve (48) switches to the second release switching position (FS2) when the first spool diverter (24, 74, 94) is in the second spool diverter switching position (S12).

B2 The hydraulic valve assembly (10) according to paragraph B1, wherein the shut-off valve (48) is biased to the blocking position (SS).

B3 The hydraulic valve assembly (10) according to paragraph B1 or B2, wherein the first valve section (14) comprises a first reset device (56), wherein the first reset device (56) biases the first spool diverter (24, 74, 94) into the second spool diverter switching position (S12).

B4 The hydraulic valve assembly (10) according to any one of the preceding paragraphs B1 to B3, wherein the shut-off valve (48) is disposed between the connection section (12) and the first spool piston (22) in the pressure line (46).

B5 The hydraulic valve assembly (10) according to paragraph B4, wherein the hydraulic valve assembly (10) comprises an intermediate section (60) disposed between the connection section (12) and the first valve section (14), wherein the shut-off valve (48) is disposed in the intermediate section (60).

B6 The hydraulic valve assembly (10) according to any one of the preceding paragraphs B1 to B5, wherein the hydraulic valve assembly (10) comprises at least one second valve section (16) which can be pressurized by the connection section (12) via the pressure line (46), the second valve section (16) having a second spool piston (26), a second spool diverter (28, 78, 98), at least one first consumer port (A14, B14) of the second valve section (16) and at least one second consumer port (A24, B24) of the second valve section (16), the first group (G1.1) of hydraulic consumers can be controlled via the at least one first consumer port (A14, B14) of the second valve section (16), the second group (G2) of hydraulic consumers can be controlled via the at least one second consumer port (A24, B24) of the second valve section (16), the second spool diverter (28, 78, 98) can be switched into a first spool diverter switching position (S21) and a second spool diverter switching position (S22), so that the first group (G1.1) of hydraulic consumers can be controlled via the second spool piston (26) when the second spool diverter (28, 78, 99) is in the first spool diverter switching position (S21), and so that the second group (G2) of hydraulic consumers can be controlled via the second spool piston (22) when the second spool diverter (28, 78, 98) is in the second spool diverter switching position (S22), wherein the first spool diverter (24, 74, 94) and the second spool diverter (28, 78, 98) switch together and in parallel into the respective first spool diverter switching position (S11, S21) or into the respective second spool diverter switching position (S12, S22), wherein the second valve section (16) preferably comprises a second reset device (58), wherein the second reset device (58) biases the second spool diverter (28, 78, 98) into the second spool diverter switching position (S22).

B7 The hydraulic valve assembly (10) according to any one of the preceding any one of the preceding paragraphs B1 to B6, wherein the first valve section (14) comprises at least one third consumer port (A31, B31) of the first valve section (14), a third group (G1.2) of hydraulic consumers can be controlled via the at least one third consumer port (A31, B31) of the first valve section (14), the first spool diverter (24, 74, 94) can be switched into a third spool diverter switching position (S13), so that the third group (G1.2) of hydraulic consumers can be controlled via the first spool piston (22) when the first spool diverter (24, 74, 94) is in the third spool diverter switching position (S13).

B8 The hydraulic valve assembly (10) according to paragraph B7, wherein the second valve section (16) has at least one third consumer port (A34, B34) of the second valve section (16), the third group (G1.2) of hydraulic consumers can be controlled via the at least one third consumer port (A34, B34) of the second valve section (16), the second spool diverter (28, 78, 98) can be switched into a third spool diverter switching position (S23), so that the third group (G1.2) of hydraulic consumers can be controlled via the second spool piston (24) when the second spool diverter (28, 78, 98) is in the third spool diverter switching position (S23), wherein the first spool diverter (24, 74, 94) can be switched together and in parallel with the second spool diverter (28, 78, 98) into the respective third spool diverter switching position (S13, S23).

B9 The hydraulic valve assembly according to paragraph B8, wherein the shut-off valve (48) switches to the first release switching position (FS1) when the first spool diverter (24, 74, 94) and the second spool diverter (28, 78, 98) are in the third spool diverter switching position (S13, S23).

B10 The hydraulic valve assembly (10) according to any one of the preceding paragraphs B1 to B9, wherein the hydraulic valve assembly (10) comprises a hydraulic pilot control device (30), the hydraulic pilot control device (30) being configured to apply a pilot pressure the first spool diverter (24, 74, 94) and/or the second spool diverter (28, 78, 94) for common and parallel switching into the first spool diverter switching position (S1, S21) and/or the third spool diverter switching position (S13, S23), and wherein pilot pressure can be applied to the shut-off valve (48) via the hydraulic pilot control device (30) for switching from the blocking position (SS) into the first release switching position (FS1) or into the second release switching position (FS2).

B11 The hydraulic valve assembly (10) according to paragraph B10, wherein the hydraulic pilot control device (30) has at least one first shut-off valve pilot line (50) for switching the shut-off valve (48) from the blocking position (SS) to the first release switching position (FS1), wherein a pilot pressure is only applied to the at least one first shut-off valve pilot line (50) when the first spool diverter (24, 74) and the second spool diverter (28, 78) are each in the first spool diverter switching position (S11, S21) or when the first spool diverter (24, 74) and the second spool diverter (28, 78) are each in the third spool diverter switching position (S13, S23).

B12 The hydraulic valve assembly (10) according to paragraph B11, wherein the hydraulic pilot device (30) comprises a pilot valve device (32), a pilot line (34), a return line (36), a first pilot branch (38), and a second pilot branch (40), wherein a pilot pressure in the first pilot branch (38) switches the first spool diverter (24, 74, 94) and the second spool diverter (28, 78, 98) together into the respective first spool diverter switching position (S11, S21), wherein a pilot pressure in the second pilot branch (40) switches the first spool diverter (24, 74, 94) and the second spool diverter (28, 78, 98) together into the respective third spool diverter switching position (S13, S23), wherein the pilot valve device (32) in a first switching position applies pilot pressure to the first pilot branch (38) and connects the second pilot branch (40) to the return line (36), and wherein the pilot valve device (32) in a second switching position applies pilot pressure to the second pilot branch (40) and connects the first pilot branch (38) to the return line (36).

B13 The hydraulic valve assembly (10) according to paragraph B12, wherein the at least one first shut-off valve pilot line (50) can be pressurized with pilot pressure via the first pilot branch (38) and/or via the second pilot branch (40).

B14 The hydraulic valve assembly (10) according to any one of the paragraphs B11 or B12 or B13, wherein the at least one first shut-off valve pilot line (50) can be relieved to the tank (T) via a first relief line (52), the first relief line (52) preferably opening into the return line (36) of the hydraulic pilot device (30), a first hydraulic resistor (54) preferably being disposed in the first relief line (52), the first hydraulic resistor (54) preferably being a nozzle.

B15 The hydraulic valve assembly according to any one of the paragraphs B12 or B13 or B14, wherein the hydraulic valve assembly (10) has a second shut-off valve pilot line (66) for switching the shut-off valve (48) from the blocking position (SS) to the second release switching position (FS2), wherein pilot pressure is applied to the second shut-off valve pilot line (66) in a third switching position of the pilot valve device (32), wherein the second shut-off valve pilot line (66) can preferably be relieved to the tank (T) via a second relief line (68), wherein the second relief line (68) preferably opens into the return line (36) of the hydraulic pilot device (30), wherein a second hydraulic resistor (70) is preferably disposed in the second relief line (68), wherein the second hydraulic resistor (70) is preferably a nozzle.

B16 A mobile hydraulic system comprising a hydraulic valve assembly (10) according to one of the previous paragraphs B1 to B15, wherein the mobile hydraulic system preferably comprises at least the first group (G1) of hydraulic consumers and the second group (G2) of hydraulic consumers, wherein the first group (G1) of hydraulic consumers is connected in particular to the first consumer port (A11, B11) of the first valve section (14) and to the first consumer port (A14, B14) of the second valve section (16), and the second group (G2) of hydraulic consumers is connected in particular to the second consumer port (A21, B21) of the first valve section (14) and to the second consumer port (A24, B24) of the second valve section (16).

B17 A commercial vehicle comprising a mobile hydraulic system according to paragraph B16.

C1 Hydraulic valve assembly (10) with a connection section (12), a first valve section (14), a pressure line (46) and a tank line (88), wherein the first valve section (14) can be pressurized by the connection section (12) via the pressure line (46) and relieved via the tank line (88),
  a. wherein the first valve section (14) comprises a first spool (22), in particular a proportional first spool, a first spool diverter (24, 74, 94), a first consumer port (A11), a second consumer port (B11), a third consumer port (A21), a fourth consumer port (B21), a fifth consumer port (A31), and a sixth consumer port (B31) of the first valve section (14),
  b. wherein the first spool piston (22) can be switched from a neutral position (NS1) into a first spool piston switching position (SK11) and a second spool piston switching position (SK12),
  c. wherein the first spool diverter (24, 74, 94) can be switched at least into a first spool diverter switching position (S11), a second spool diverter switching position (S12) and a third spool diverter switching position (S13),
  d. wherein the first consumer port (A11) and the second consumer port (B11) of the first valve section (14) can be controlled via the first spool piston (22) in the first spool diverter switching position (S11) in such a way that, in the first spool piston switching position (SK11), the first consumer port (A11) of the first valve section (14) is connected to the pressure line (46) and the second consumer port (B11) of the first valve section (14) is connected to the tank line (88) and in that, in the second spool piston switching position (SK12), the first consumer port (A11) of the first valve section (14) is connected to the tank line (88) and the second consumer port (B11) of the first valve section (14) is connected to the pressure line (46),
  e. wherein the third consumer port (A21) and the fourth consumer port (B21) of the first valve section (14) can be controlled via the first spool piston (22) in the third spool diverter switching position (S13) in such a way that, in the first spool piston switching position (SK11), the third consumer port (A21) of the first valve section (14) is connected to the pressure line (46) and the fourth consumer port (B21) of the first valve section (14) is connected to the tank line (88) and in that, in the second spool piston switching position (SK12), the third consumer port (A21) of the first valve section (14) is connected to the tank line (88) and the fourth consumer port (B21) of the first valve section (14) is connected to the pressure line (46), and
  f. wherein the fifth consumer port (A31) and the sixth consumer port (B31) of the first valve section (14) can be controlled via the first spool piston (22) in the second spool diverter switching position (S12) in such a way that, in the first spool piston switching position (SK11), the fifth consumer port (A31) of the first valve section (14) is connected to the pressure line (46) and the sixth consumer port (B31) of the first valve section (14) is connected to the tank line (88) and in that, in the second spool piston switching position (SK12), the fifth consumer port (A31) of the first valve section (14) is connected to the tank line (88) and the sixth consumer port (B31) of the first valve section (14) is connected to the pressure line (46).

C2 Hydraulic valve assembly (10) according to paragraph C1, wherein the first valve section (14) comprises a first main return line (72) connected to the tank line (88), wherein the first spool diverter (74) comprises a first collecting channel (80), wherein the third consumer port (A21), the fourth consumer port (B21), the fifth consumer port (A31) and the sixth consumer port (B31) of the first valve section (14) are connected to the first main return line (72) via the first collecting channel (80) in the first spool diverter switching position (S11) of the first spool diverter (74), wherein the first consumer port (A11), the second consumer port (B11), the fifth consumer port (A31), and the sixth consumer port (B31) of the first valve section (14) are connected to the first main return line (72) via the first collecting channel (80) in the second spool diverter switching position (S12) of the first spool diverter (74), and wherein the first consumer port (A11), the second consumer port (A21), the third consumer port (A21) and the fourth consumer port (B21) of the first valve section (14) are connected to the first main return line (72) via the first collecting channel (80) in the third spool diverter switching position (S13) of the first spool diverter (74).

C3 Hydraulic valve assembly (10) according to paragraph C2, wherein the first collecting channel (80) comprises a first throttle (82).

C4 Hydraulic valve assembly (10) according to any one of the preceding paragraphs C1 to C3, wherein the hydraulic valve assembly (10) has at least one second valve section (16) which can be pressurized by the connection section (12) via the pressure line (46), the second valve section (16) being relievable via the tank line (88) and having a in particular proportional second spool piston (26), a second spool diverter (28, 78, 98), a first consumer port (A14), a second consumer port (B14) a third consumer port (A24), a fourth consumer port (B24), a fifth consumer port (A34) and a sixth consumer port (B34) of the second valve section (16), wherein the second spool piston (26) can be switched from a neutral position (NS2) into a first spool piston switching position (SK21) and a second spool piston switching position (SK22), wherein the second spool diverter (28, 78, 98) can be switched into a first spool diverter switching position (S21), a second spool diverter switching position (S22) and a third spool diverter switching position (S23), wherein the first consumer port (A14) and the second consumer port (B14) of the second valve section (16) are controllable via the second spool piston (26) in the first spool diverter switching position (S21) in such a way that, in the first spool piston switching position (SK21), the first consumer port (A14) of the second valve section (16) is connected to the pressure line (46) and the second consumer port (B14) of the second valve section (16) is connected to the tank line (88) and in that, in the second spool piston switching position (SK22), the first consumer port (A14) of the second valve section (16) is connected to the tank line (88) and the second consumer port (B14) of the second valve section (16) is connected to the pressure line (46), the third consumer port (A24) and the fourth consumer port (B24) of the second valve section (16) being controllable in the third spool diverter switching position (S23) via the second spool piston (26) in such a way that, in the first spool piston switching position (SK21), the third consumer port (A24) of the second valve section (16) is connected to the pressure line (46) and the fourth consumer port (B24) of the second valve section (16) is connected to the tank line (88) and in that, in the second spool piston switching position (SK22), the third consumer port (A24) of the second valve section (16) is connected to the tank line (88) and the fourth consumer port (B24) of the second valve section (16) is connected to the pressure line (46), and the fifth consumer port (A34) and the sixth consumer port (B34) of the second valve section (16) being controllable in the second spool diverter switching position (S22) via the second spool piston (26) in such a way that, in the first spool piston switching position (SK21), the fifth consumer port (A34) of the second valve section (16) is connected to the pressure line (46) and the sixth consumer port (B34) of the second valve section (16) is connected to the tank line (88) and in that, in the second spool piston switching position (SK22), the fifth consumer port (A34) of the second valve section (16) is connected to the tank line (88) and the sixth consumer port (B36) of the second valve section (16) is connected to the pressure line (46).

C5 Hydraulic valve assembly (10) according to paragraph C4, wherein the second valve section (16) comprises a second main return line (76) connected to the tank line (88), the second spool diverter (78) including a second collecting channel (84), wherein the third consumer port (A24), the fourth consumer port (B24), the fifth consumer port (A34), and the sixth consumer port (B34) of the second valve section (16) are connected to the second main return line (72) via the second collecting channel (84) in the first spool diverter switching position (S21) of the second spool diverter (78), wherein the first consumer port (A14), the second consumer port (B14), the fifth consumer port (A34), and the sixth consumer port (B34) of the second valve section (16) are connected to the second main return line (76) via the second collecting channel (84) in the third spool diverter switching position (S23) of the second spool diverter (78), and wherein the first consumer port (A14), the second consumer port (A24), the third consumer port (A24), and the fourth consumer port (B24) of the second valve section (16) are connected to the second main return line (76) via the second collecting channel (84) in the second spool diverter switching position (S22) of the second spool diverter (78).

C6 Hydraulic valve assembly (10) according to paragraph C5, wherein the second collecting channel (84) comprises a second throttle (86).

C7 Hydraulic valve assembly (10) according to any one of the preceding paragraphs C4 to C6, wherein the hydraulic valve assembly comprises a hydraulic pilot control device (30) for a joint and parallel switching of the first spool diverter (24, 74, 94) and the second spool diverter (28, 78, 98).

C8 Hydraulic valve assembly (10) according to any one of the preceding paragraphs C1 to C7, wherein in the neutral position (NS1) of the first spool piston (22), the consumer ports (A11, B11, A21, B21, A31, B31) controlled via the first spool diverter (24, 74, 94) are blocked or relieved to the tank line (88), and/or in that, in the neutral position (NS2) of the second spool piston (26), the consumer ports (A14, B14, A24, B24, A34, B34) controlled via the second spool diverter (28, 78, 98) are blocked or relieved to the tank line (88).

C9 Mobile hydraulic system having a hydraulic valve assembly (10) according to one of the preceding paragraphs C1 to C8, the mobile hydraulic system preferably having at least a first group (G1.1) of hydraulic consumers and a second group (G2) of hydraulic consumers, wherein the first group (G1) of hydraulic consumers is connected in particular to the first consumer port (A11) and the second consumer port (B11) of the first valve section (14) and to the first consumer port (A14) and the second consumer port (B14) of the second valve section (16), and wherein the second group (G2) of hydraulic consumers is connected in particular to the third consumer port (A21) and the fourth consumer port (B21) of the first valve section (14) and to the third consumer port (A24) and the fourth consumer port (B24) of the second valve section (16).

C10 Mobile hydraulic system according to paragraph C9, wherein the mobile hydraulic system preferably has at least one third group (G1.2) of hydraulic consumers, wherein the third group (G1.2) of hydraulic consumers is connected in particular to the fifth consumer port (A31) and the sixth consumer port (B31) of the first valve section (14) and to the fifth consumer port (A34) and the sixth consumer port (B34) of the second valve section (16).

C11 A commercial vehicle comprising a mobile hydraulic system according to paragraph C9 or C10.

LIST OF REFERENCE SIGNS 10 hydraulic valve assembly
12 connection section
14 first valve section
16 second valve section
18 third valve section
20 fourth valve section
22 first spool piston
24 first spool diverter
26 second spool piston
28 second spool diverter
30 hydraulic pilot control device
32 pilot valve device
34 pilot line
36 return line 38 first pilot branch
40 second pilot branch
42 first pilot valve
44 second pilot valve
46 pressure line
48 shut-off valve
50 first shut-off valve pilot line
52 first relief line
54 first hydraulic resistor/nozzle
56 first reset device
58 second reset device
60 intermediate section
62 end plate
64 third pilot valve/shut-off pilot valve
66 second shut-off valve pilot line
68 second relief line
70 second hydraulic resistor/nozzle
72 first main return line
74 first spool diverter
76 second main return line
78 second spool diverter
80 collecting channel of first spool diverter
82 first throttle of the first spool diverter
84 collecting channel of second spool diverter
86 second throttle of second spool diverter
88 tank line
89 displacement transducer
90 selector valve
92 first position sensor
94 first spool diverter
96 second position sensor
98 second spool diverter
100 mobile hydraulic system
200 commercial vehicle
A11 (first) consumer port of the first valve section
A14 (first) consumer port of the second valve section
A21 (third) consumer port of the first valve section
A24 (third) consumer port of the second valve section
A31 (fifth) consumer port of the first valve section
A34 (fifth) consumer port of the second valve section
B11 (second) consumer port of the first valve section
B14 (second) consumer port of the second valve section
B21 (fourth) consumer port of the first valve section
B24 (fourth) consumer port of the second valve section
B31 (sixth) consumer port of the first valve section
B34 (sixth) consumer port of the second valve section
FS1 first release switching position
FS2 second release switching position
G1 first group of hydraulic consumers
G2 second group of hydraulic consumers
G3 third group of hydraulic consumers
NS1 neutral position of first spool piston
NS2 neutral position of second spool piston
P pressure connection/pump
R tank
S11 first spool diverter switching position of first spool diverter
S12 second spool diverter switching position of first spool diverter
S13 third spool diverter switching position of first spool diverter
S21 first spool diverter switching position of second spool diverter
S22 second spool diverter switching position of second spool diverter
S23 third spool diverter switching position of second spool diverter
SK11 first spool piston switching position of the first spool piston
SK12 second spool piston switching position of the first spool piston
SK21 first spool piston switching position of the second spool
SK22 second spool piston switching position of the second spool piston
SS blocking position

The invention claimed is:

1. A hydraulic valve assembly, comprising: a connection section; a first valve section which can be pressurized via the connection section; at least one second valve section which can be pressurized via the connection section; and a hydraulic pilot control device with a pilot valve device, the hydraulic pilot control device comprising a pilot line, a return line, a first pilot branch, and a second pilot branch, wherein the first valve section includes a first spool piston, a first spool diverter, at least one consumer port of a first type of the first valve section, and at least one consumer port of a second type of the first valve section, and wherein the second valve section includes a second spool piston, a second spool diverter, at least one consumer port of a first type of the second valve section, and at least one consumer port of a second type of the second valve section, and the first spool diverter and the second spool diverter can each be switched at least into a first spool diverter switching position and a second spool diverter switching position so that the at least one consumer port of the first type of the first valve section can be pressurized via the first spool piston and the at least one consumer port of the first type of the second valve section can be pressurized via the second spool piston when the first spool diverter and the second spool diverter are each in the first spool diverter switching position, and so that the at least one consumer port of the second type of the first valve section can be pressurized via the first spool piston and the at least one consumer port of the second type of the second valve section can be pressurized via the second spool piston when the first spool diverter and the second spool diverter are each in the second spool diverter switching position, wherein pilot pressure can be applied to the first spool diverter and the second spool diverter via the hydraulic pilot control device, wherein the pilot pressure is applied in parallel to the first spool diverter and the second spool diverter in a first switching position of the pilot valve device for switching together into the respective first spool diverter switching position, the pilot pressure is applied in parallel to the first spool diverter and the second spool diverter in a second switching position of the pilot valve device for parallel switching together into the second spool diverter switching position, wherein a pilot pressure in the first pilot branch switches the first spool diverter and the second spool diverter together into the respective first spool diverter switching position, wherein a pilot pressure in the second pilot branch switches the first spool diverter and the second spool diverter together into the respective second spool diverter switching position, wherein the pilot valve device in the first switching position applies the pilot pressure to the first pilot branch and connects the second pilot branch to the return line, and wherein the pilot valve device in the second switching position applies the pilot pressure to the second pilot branch and connects the first pilot branch to the return line.

2. The hydraulic valve assembly according to claim 1, wherein the pilot valve device comprises a first pilot valve and a second pilot valve, wherein in the first switching position of the pilot valve device, the first pilot valve connects the first pilot branch to the pilot line and the second pilot valve connects the second pilot branch to the return line, and wherein in the second switching position of the pilot valve device, the first pilot valve connects the first pilot branch to the return line and the second pilot valve connects the second pilot branch to the pilot line.

3. The hydraulic valve assembly claim 1, further comprising a pressure line for pressurizing the first valve section and the second valve section, wherein a shut-off valve is disposed in the pressure line.

4. The hydraulic valve assembly according to claim 3, wherein the shut-off valve can be switched from a blocking position to an open position via the hydraulic pilot control device.

5. The hydraulic valve assembly according to claim 4, wherein the shut-off valve can be switched from the blocking position to the open position via the hydraulic pilot control device, in that the hydraulic valve assembly comprises at least one shut-off valve pilot line via which the pilot pressure can be applied to the shut-off valve in order to switch into an open position releasing the pressure line, the hydraulic pilot control device comprising a shut-off pilot valve, wherein the shut-off pilot valve is configured to connect the shut-off valve to the pilot line or the return line.

6. The hydraulic valve assembly according to claim 5, wherein the at least one shut-off valve pilot line can be relieved to a tank via a relief line.

7. The hydraulic valve assembly according to claim 6, wherein a hydraulic resistor is disposed in the relief line.

8. The hydraulic valve assembly according to claim 7, wherein the hydraulic resistor is a nozzle.

9. The hydraulic valve assembly according to claim 6, wherein the relief line opens into the return line of the hydraulic pilot control device.

10. The hydraulic valve assembly according to claim 4, wherein the hydraulic pilot control device has at least one shut-off valve pilot line for switching the shut-off valve from the blocking position to the open position, wherein the pilot pressure is applied to the at least one shut-off valve pilot line only when the first spool diverter and the second spool diverter are each in the first spool diverter switching position or when the first spool diverter and the second spool diverter are each in the second spool diverter switching position.

11. The hydraulic valve assembly according to claim 10, wherein the at least one shut-off valve pilot line can be pressurized with pilot pressure via the first pilot branch and/or via the second pilot branch.

12. A mobile hydraulic system with the hydraulic valve assembly according to claim 1, wherein the mobile hydraulic system has at least a first group of hydraulic consumers and a second group of hydraulic consumers, wherein the first group of hydraulic consumers is connected to the at least one consumer port of the first type of the first valve section and to the at least one consumer port of the first type of the second valve section, and the second group of hydraulic consumers being connected to the at least one consumer port of the second type of the first valve section and to the at least one consumer port of the second type of the second valve section.

13. A commercial vehicle having the mobile hydraulic system according to claim 12.

14. A hydraulic valve assembly, comprising:
a connection section;
a first valve section which can be pressurized via the connection section;
at least one second valve section which can be pressurized via the connection section; and
a hydraulic pilot control device with a pilot valve device,
wherein the first valve section includes a first spool piston, a first spool diverter, at least one consumer port of a first type of the first valve section, and at least one consumer port of a second type of the first valve section, and
wherein the second valve section includes a second spool piston, a second spool diverter, at least one consumer port of a first type of the second valve section, and at least one consumer port of a second type of the second valve section, and the first spool diverter and the second spool diverter can each be switched at least into a first spool diverter switching position and a second spool diverter switching position,
so that the at least one consumer port of the first type of the first valve section can be pressurized via the first spool piston and the at least one consumer port of the first type of the second valve section can be pressurized via the second spool piston when the first spool diverter and the second spool diverter are each in the first spool diverter switching position, and
so that the at least one consumer port of the second type of the first valve section can be pressurized via the first spool piston and the at least one consumer port of the second type of the second valve section can be pressurized via the second spool piston when the first spool diverter and the second spool diverter are each in the second spool diverter switching position,
wherein pilot pressure can be applied to the first spool diverter and the second spool diverter via the hydraulic pilot control device,
wherein the pilot pressure is applied in parallel to the first spool diverter and the second spool diverter in a first switching position of the pilot valve device for switching together into the respective first spool diverter switching position,
wherein the first valve section comprises a first reset device, wherein the first reset device biases the first spool diverter into a third spool diverter position, wherein the first valve section comprises at least one consumer port of a third type of the first valve section, and/or the second valve section has a second reset device, the second reset device biasing the second spool diverter into a third spool diverter switching position, the second valve section having at least one consumer port of a third type of the second valve section, and
wherein the at least one consumer port of the third type of the first valve section can be pressurized via the first spool piston and/or the at least one consumer port of the third type of the second valve section can be pressurized via the second spool piston when the first spool diverter and/or the second spool diverter are each in the third spool diverter switching position.

* * * * *